United States Patent
Lorkowski et al.

(10) Patent No.: US 11,746,946 B2
(45) Date of Patent: Sep. 5, 2023

(54) ADA-COMPLIANT PIPE-INSULATING SLEEVES

(71) Applicant: Oatey Co., Cleveland, OH (US)

(72) Inventors: Aaron Lorkowski, North Ridgeville, OH (US); Kai Zhang, Cleveland, OH (US); Willie Perez, Hudson, OH (US)

(73) Assignee: Oatey Co., Cleveland, OH (US)

( * ) Notice: Subject to any disclaimer, the term of this patent is extended or adjusted under 35 U.S.C. 154(b) by 0 days.

(21) Appl. No.: 16/402,386

(22) Filed: May 3, 2019

(65) Prior Publication Data
US 2019/0338884 A1    Nov. 7, 2019

Related U.S. Application Data

(60) Provisional application No. 62/666,979, filed on May 4, 2018.

(51) Int. Cl.
| | |
|---|---|
| *F16L 59/16* | (2006.01) |
| *F16L 59/18* | (2006.01) |
| *F16L 59/02* | (2006.01) |
| *E03C 1/32* | (2006.01) |
| *F16L 59/22* | (2006.01) |

(52) U.S. Cl.
CPC ............... *F16L 59/18* (2013.01); *E03C 1/32* (2013.01); *F16L 59/023* (2013.01); *F16L 59/22* (2013.01); *E03C 2001/321* (2013.01)

(58) Field of Classification Search
CPC ......... F16L 59/023; F16L 59/16; F16L 59/18; F16L 59/22
USPC .......................... 137/375; 138/156, 157, 158
See application file for complete search history.

(56) References Cited

U.S. PATENT DOCUMENTS

| | | | |
|---|---|---|---|
| 3,191,632 A | 6/1965 | Keiding | |
| 4,514,241 A | 4/1985 | Maukola | |
| 5,006,185 A | 4/1991 | Anthony et al. | |
| 5,348,044 A | 9/1994 | Eugene et al. | |
| 5,701,929 A | 12/1997 | Helmsderfer | |
| 6,012,480 A | 1/2000 | Helmsderfer | |
| 6,488,998 B1 * | 12/2002 | Crook .................... | A01N 25/34 138/141 |
| 6,634,390 B2 | 10/2003 | Toth | |
| D489,435 S | 5/2004 | Trueb et al. | |
| 6,739,353 B2 | 5/2004 | Lechuga | |
| 7,100,633 B2 | 9/2006 | Lechuga | |
| 7,464,728 B2 | 12/2008 | Cairns | |
| 7,749,923 B2 | 7/2010 | Moore et al. | |
| D653,311 S | 1/2012 | Lechuga | |

(Continued)

*Primary Examiner* — Paul J Gray
(74) *Attorney, Agent, or Firm* — BakerHostetler

(57) ABSTRACT

A system of pipe insulating sleeves includes a series of elastomeric foam insulating sleeves that are capable of opening up to, and beyond, 180 degrees, to accommodate and capture an undersink pipe. The disclosed system may include a number of different sleeves that are capable of coupling to one another at respective couplers so as to form the system. The sleeves may include fastening mechanisms to retain the sleeves in the closed configuration while capturing the pipe, so as to create a smooth, streamlined appearance that is aesthetically pleasing. Also disclosed is a method of installing the sleeves. The sleeves are made of an elastomeric foam material that has heat insulating properties, and which may also have antibacterial and antimicrobial properties that make it particularly advantageous for use in undersink pipe insulating.

19 Claims, 19 Drawing Sheets

(56) References Cited

U.S. PATENT DOCUMENTS

| | | |
|---|---|---|
| 8,506,735 B2 | 8/2013 | Whitaker et al. |
| 2002/0108663 A1 | 8/2002 | Lechuga |
| 2004/0211467 A1 | 10/2004 | Lechuga |
| 2011/0084474 A1 | 4/2011 | Paden et al. |
| 2015/0260329 A1* | 9/2015 | Bond .................... F16L 59/08 428/35.2 |
| 2016/0161043 A1 | 6/2016 | Bhatta et al. |

* cited by examiner

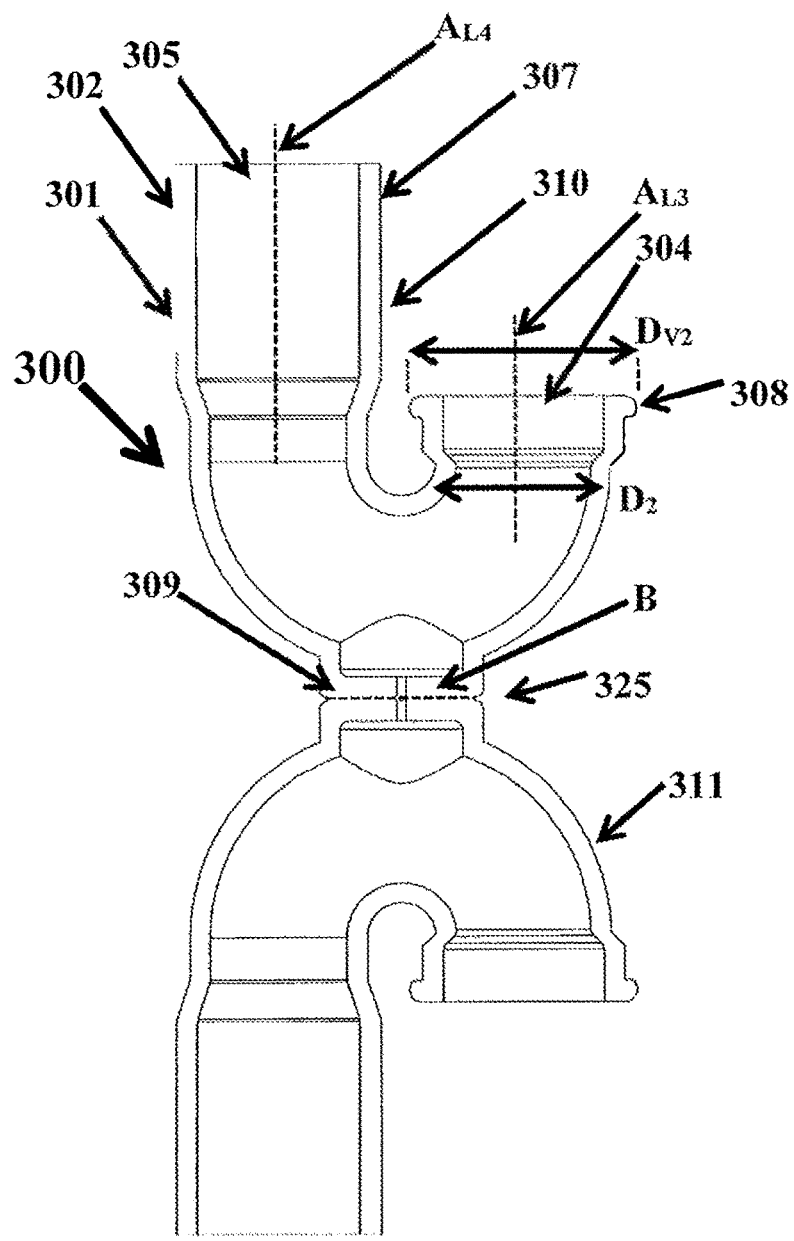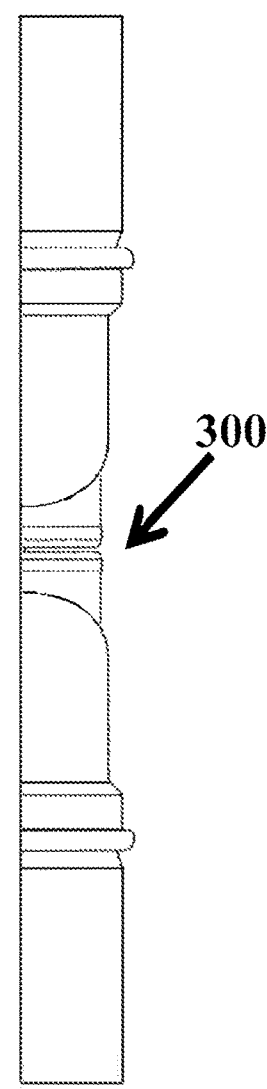
Figure 4C
Figure 4D

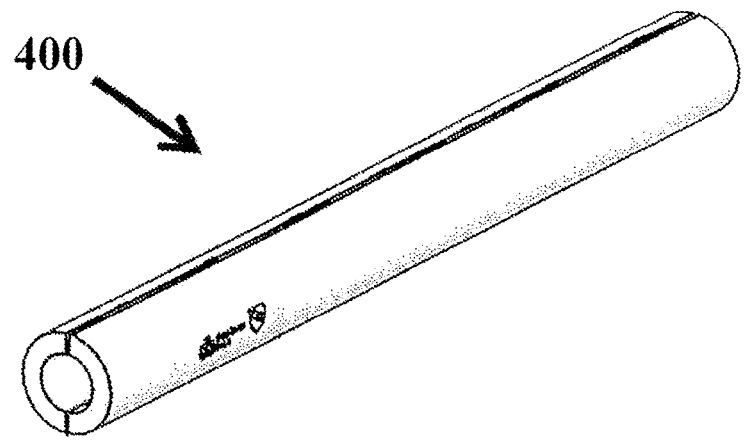
Figure 5A
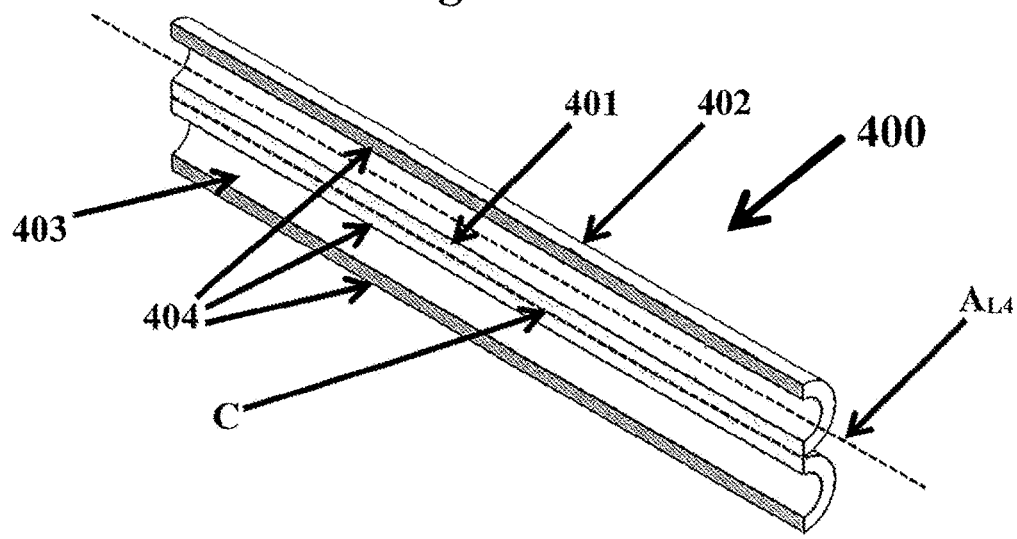
Figure 5B
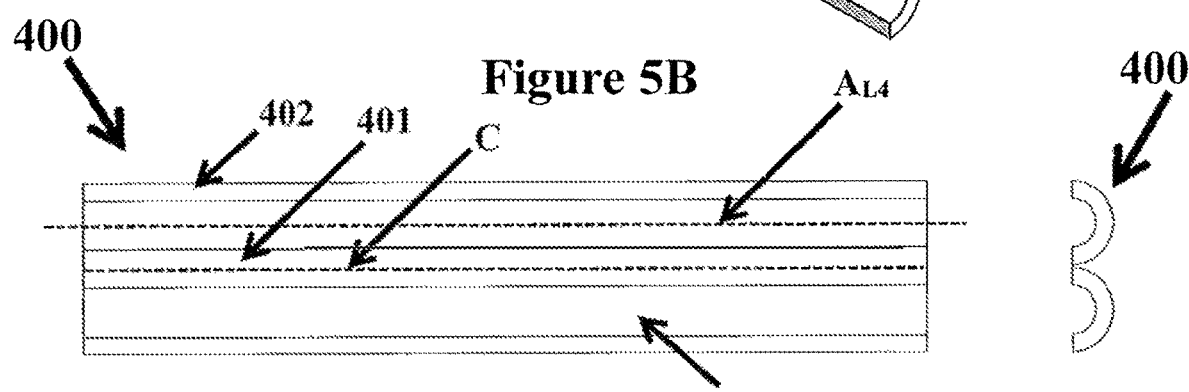 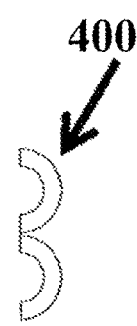
Figure 5C  Figure 5D

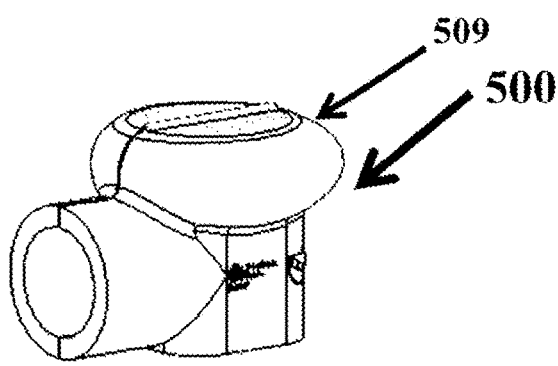
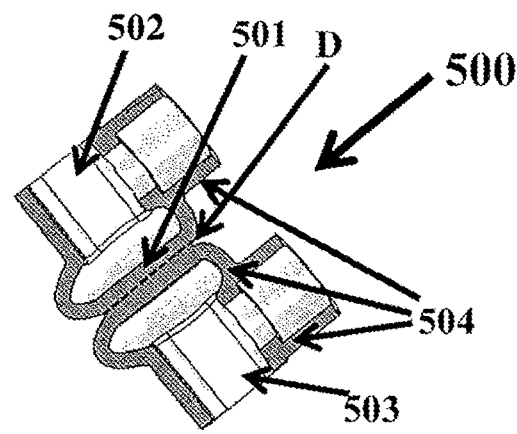
Figure 6A        Figure 6B
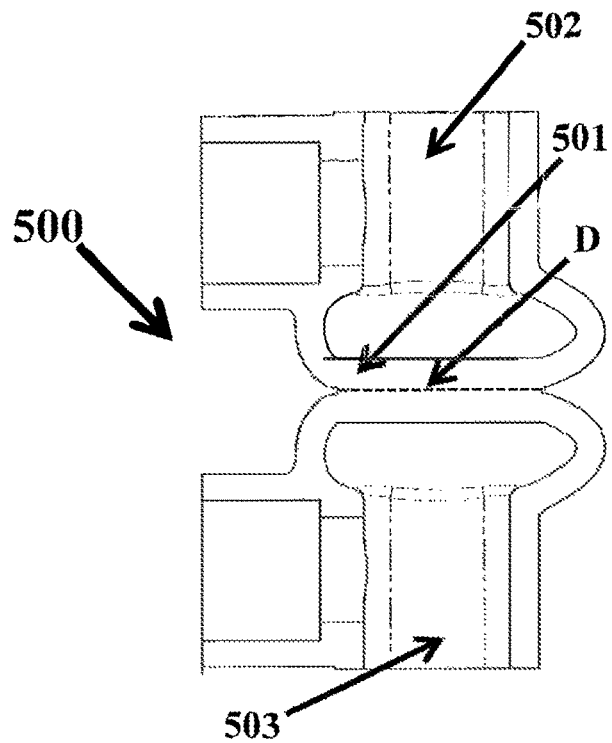
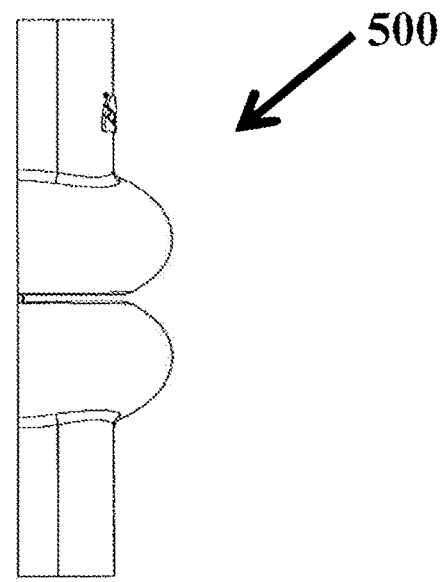
Figure 6C        Figure 6D

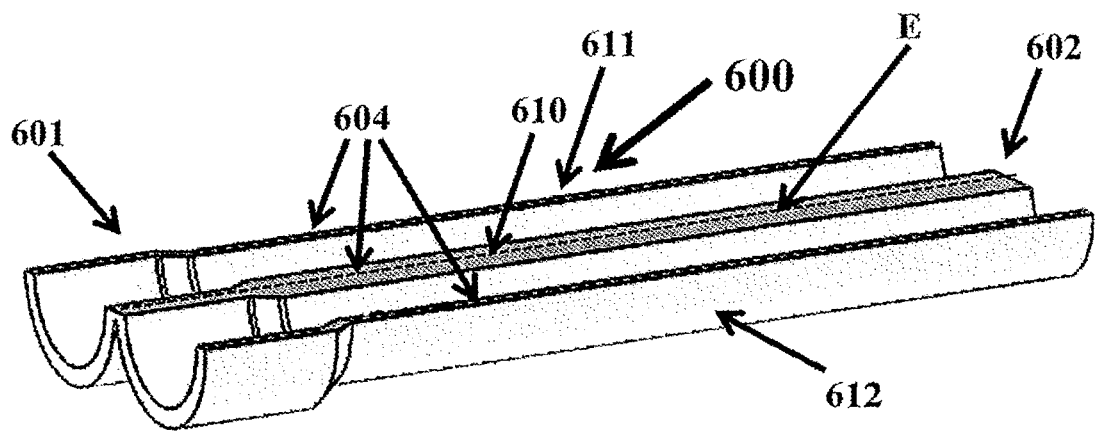
Figure 7A
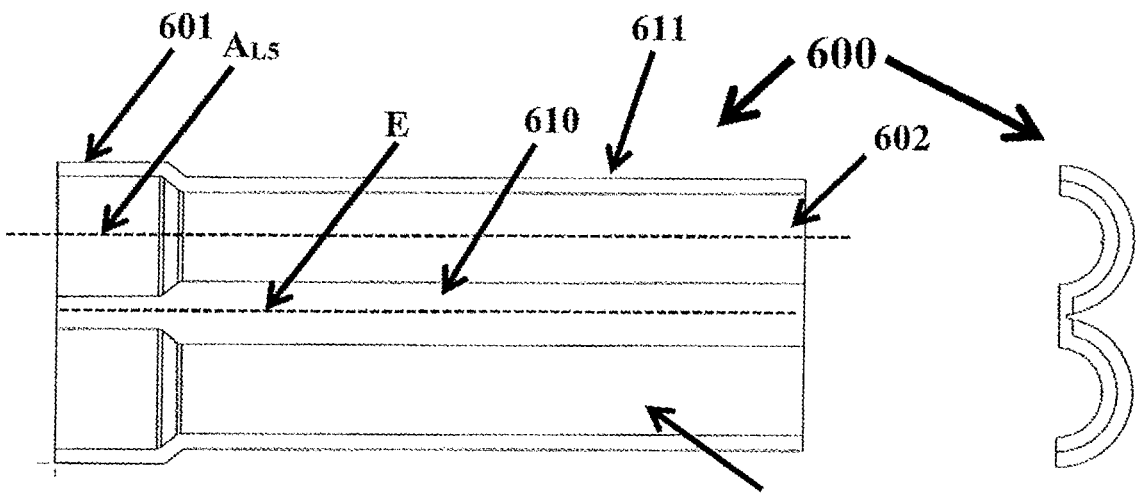 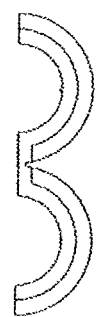
Figure 7B  Figure 7C

ADA-COMPLIANT PIPE-INSULATING SLEEVES

CROSS-REFERENCE TO RELATED APPLICATIONS

This application claims the benefit of U.S. Provisional Application No. 62/666,979, filed May 4, 2018, the disclosure of which is incorporated by reference herein in its entirety.

TECHNICAL FIELD

The present disclosure relates to pipe-insulating sleeves for surrounding, encasing, and thermally insulating pipes (e.g., undersink piping), such pipe-insulating sleeves being compliant with federal and state regulations, most notably the Americans with Disabilities Act ("ADA"), regarding the same.

BACKGROUND

It is well known that water that drains away from a sink or basin, such as a restroom sink, will travel though a drain opening of the sink and empty out into undersink piping. The undersink piping will direct water away from the sink and into the building's waste water system. The undersink drain piping is commonly referred to as a "P-trap" drain assembly, and "P-trap" assemblies are common to many sinks in both commercial and residential applications.

P-trap assemblies, generally, include a vertical pipe section which extends downwardly from the sink drain opening and below the sink to couple with a J-shaped pipe section. The J-shaped pipe section makes a 180° bend and then extends vertically upward to couple with an L-shaped pipe section which itself makes a 90° bend from the J-shaped section to extend generally horizontally into the wall so as to connect the P-trap with the waste water system of the building. The P-trap creates a vapor barrier vis-à-vis a residual level of standing water, thereby preventing undesirable vapors from passing back into the building through the drain piping. The J-shaped section also serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber.

Also extending below the sinks are separately formed hot and cold water supply pipes, commonly referred to as supply water angle valves, which include supply line sections which extend generally horizontally from the wall to connect to a respective valve and faucet line section that extends generally vertically upward from each valve to connect to the sink faucet apparatus.

Building regulations require that restroom facilities in a public building, such as restroom sinks, be accessible to all people, including disabled persons and particularly those disabled persons who must use a wheelchair. Persons in wheelchairs must usually maneuver the chair partially under a restroom sink to access it. Since the water supply pipes and P-trap drain pipes protrude from the wall and are exposed underneath the sink, there is a risk of abrasions to the person's legs from the hard piping or even burns from the temperature of the piping caused by heat transferred to the metal pipes from the water passing therethrough. Current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to cover and insulate undersink P-traps and water supply piping.

In the past, one of the more popular (and rudimentary) methods of insulation was to utilize loose foam insulation that was wrapped around the piping. However, traditional foam insulation fits poorly and is difficult to secure, resulting in wasted time and wasted money by the plumber, installer, or building owner. Furthermore, the foam wrap, due to its poor fit and inadequate securing means, is not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. While many such devices purport to adequately insulate the pipes, they have many drawbacks. For example many of these other devices and methods are difficult and time-consuming to secure and use. Many of them provide a sleeve having an opening along the length of a sleeve surface, which requires that a user physically expand and otherwise forcefully manipulate the sleeve to receive and secure the pipe. A further and more significant deficiency is encountered during removal of the sleeves, wherein a user will need to forcefully separate the sleeves from the pipe while having reduced gripping area on the sleeve due to the presence of the pipe within the cavity of the sleeve.

A further disadvantage of many existing devices is that they fail to adequately reduce or eliminate the buildup of mold and bacteria on the sleeves themselves and in/around the insulated pipes. Sleeves that insulate undersink piping are especially prone to the buildup of mold or bacteria due to the presence and unintended collection of moisture. Moisture may accumulate around the pipes and within the insulating sleeves by virtue of small leaks in the pipes or connecting valves, or from the pipes "sweating," a phenomenon that occurs when a cold pipe comes into contact with warmer and/or humid ambient air. In any case, the moisture accumulation, if not abated, can result in the growth of bacteria or mold. Such bacteria and mold can pose a significant health or sanitation hazard if someone should come into direct contact (e.g., physically touching) or indirect contact (e.g., inhalation of airborne particles) with the same. Existing devices provide an anti-bacterial and/or anti-fungal coating on the surface of the insulating material; however this coating may wear away over time or become compromised due to trauma to the sleeves. When the coating of existing systems has become compromised, those compromised portions are greatly susceptible to the growth of bacteria and/or mold.

Therefore, there is a need for a pipe insulating system for insulating undersink piping in compliance with federal and state regulations that 1) is easy to install and remove, 2) prevents the formation and buildup of bacteria and mold, and 3) is aesthetically pleasing and low cost.

The present invention provides a system of sleeves for insulating undersink piping in compliance with the required standards and regulations. The sleeves of the present invention are configured to be easily installed and removed from the pipes. The sleeves may be divided into two complementarily-shaped halves that may be rotated and/or translated with respect to one another. The degree of rotation may be up to and beyond 180 degrees. Another aspect of the present invention is that the sleeves are constructed of an elastomeric foam material, preferably ethylene-vinyl acetate (EVA) foam material, wherein the foam is specially formulated to contain anti-fungal and/or anti-bacterial components. Further, the present invention provides a system of sleeves for insulating undersink piping that is thin, low profile, aesthetically pleasing, and relatively low cost compared to existing systems on the market.

SUMMARY OF THE INVENTION

A system of insulating pipes according to a first aspect of the invention includes a body and a fastening assembly. The body extends along an axis of elongation from a first end to a second end. The body has an outer surface and an opposed inner surface that defines a channel that extends from a first opening located at the first end of the body to a second opening located at the second end of the body. The body includes a slit that extends from the first opening to the second opening. The slit has a first edge and a second edge that are each positioned between the outer surface of the body and the inner surface of the body. The fastening assembly includes a first at least one fastening element and a second at least one fastening element. The first at least one fastening element is positioned along the first edge of the slit, and the second at least one fastening element is positioned along the second edge of the slit. The first and second at least one fastening elements being configured to couple together. The body is configured to transition between a closed configuration and an open configuration. In the closed configuration the first edge abuts against the second edge and the first at least one fastening element is coupled to the second at least one fastening element, and in the open configuration, the first edge is spaced apart from the second edge and the first at least one fastening element is decoupled from the second at least one fastening element.

In a second aspect, the slit is a first slit, and the body further includes a second slit that extends from the first opening to the second opening. The second slit has a third edge and a fourth edge that are each positioned between the outer surface of the body and the inner surface of the body. The fastening assembly further includes a third at least one fastening element and a fourth at least one fastening element. The third at least one fastening element being coupled to the third edge of the second slit, and the fourth at least one fastening element being coupled to the fourth edge of the second slit. The third and fourth at least one fastening elements being configured to couple together. In the closed configuration the third edge abuts against the fourth edge and the third at least one fastening element is coupled to the fourth at least one fastening element, and in the open configuration, the third edge is spaced apart from the fourth edge and the third at least one fastening element is decoupled from the fourth at least one fastening element A method of installing the sleeve body, described in the above aspects, on an undersink pipe may be performed in a series of steps. According to an aspect of this disclosure, the series of steps comprise: transitioning the sleeve body to an open configuration, wherein in the open configuration the first edge is spaced apart from the second edge, the first edge having a first at least one fastening element coupled thereto and the second edge having a second at least one fastening element coupled thereto; retaining the pipe within the channel of the sleeve body by inserting the pipe through the slit; and transitioning the sleeve body to a closed configuration, wherein in the closed configuration the first edge abuts against the second edge and the first at least one fastening element is coupled to the second at least one fastening element so as to enclose the pipe within the sleeve body.

This summary is provided to introduce a selection of concepts that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

FIG. 4C is a front plan view of the J-shaped pipe insulating sleeve as shown in FIG. 4B;

FIG. 4D is a side plan view of the J-shaped pipe insulating sleeve as shown in FIG. 4C;

FIG. 5A is a perspective view of a supply line pipe insulating sleeve according to a first embodiment of the invention, wherein the sleeve is in a closed configuration;

FIG. 5B is a perspective view of the supply line pipe insulating sleeve as shown in FIG. 5A, wherein the sleeve is in an open configuration;

FIG. 5C is a front-plan view of the supply line pipe insulating sleeve as shown in FIG. 5B;

FIG. 5D is a side-plan view of the supply line pipe insulating sleeve as shown in FIG. 5C;

FIG. 6A is a perspective view of a supply stop pipe insulating sleeve according to a first embodiment of the invention, wherein the sleeve is in a closed configuration;

FIG. 6B is a perspective view of the supply stop pipe insulating sleeve as shown in FIG. 6A, wherein the sleeve is in an open configuration FIG. 6C is a front-plan view of the supply stop pipe insulating sleeve as shown in FIG. 6A, wherein the sleeve is in an open configuration;

FIG. 6D is a side-plan view of the supply stop pipe insulating sleeve as shown in FIG. 6C;

FIG. 7A is a perspective view of an extension tube pipe insulating sleeve according to a first embodiment of the invention, wherein the sleeve is in an open configuration;

FIG. 7B is a front-plan view of the extension tube pipe insulating sleeve as shown in FIG. 7A;

FIG. 7C is a side-plan view of the extension tube pipe insulating sleeve as shown in FIG. 7B;

DETAILED DESCRIPTION OF THE DRAWINGS

The pipe insulation system of the present invention, as shown and described herein, may comprise a series of pipe insulating sleeves for covering typical undersink piping. It is contemplated that the present pipe insulating system will be utilized for commercial undersink piping, as this is the piping with which users may come into the most contact during operation of the sink, including most notably individuals in wheelchairs whose legs will extend beneath the sink. Such usage will comply with requirements and standards as promulgated under the ADA. It is further contemplated, however, that the pipe insulation system may be used to cover any piping, regardless of location or the fluid contained therein, where insulation may be needed or desired. Such usage will advantageously provide thermal insulation to the fluid being transported through the piping by preventing internal heat from transferring into the ambient environment. Such use may reduce aggregate energy costs for building owners by reducing heat loss and thereby reducing the energy needed to heat or cool fluid transported through supply lines. Additional aspects of these other applications may provide protection to temperature or moisture-sensitive equipment or the like immediately adjacent the piping, which would otherwise be adversely affected by heat propagating from the pipe, but for the insulation provided by the sleeves. Other benefits and uses of the invention will become apparent to one of skill in the art in view of the foregoing detailed description.

In any case, it will be understood that although the pipe insulating sleeves of the presently disclosed invention may be molded into any shape or configuration (as described in greater detail below with respect to the material and formulation of the same), the detailed description that follows will describe primarily a series of sleeves that cooperate to insulate undersink piping. However, it will be understood that such application is non-limiting.

Figure 1:
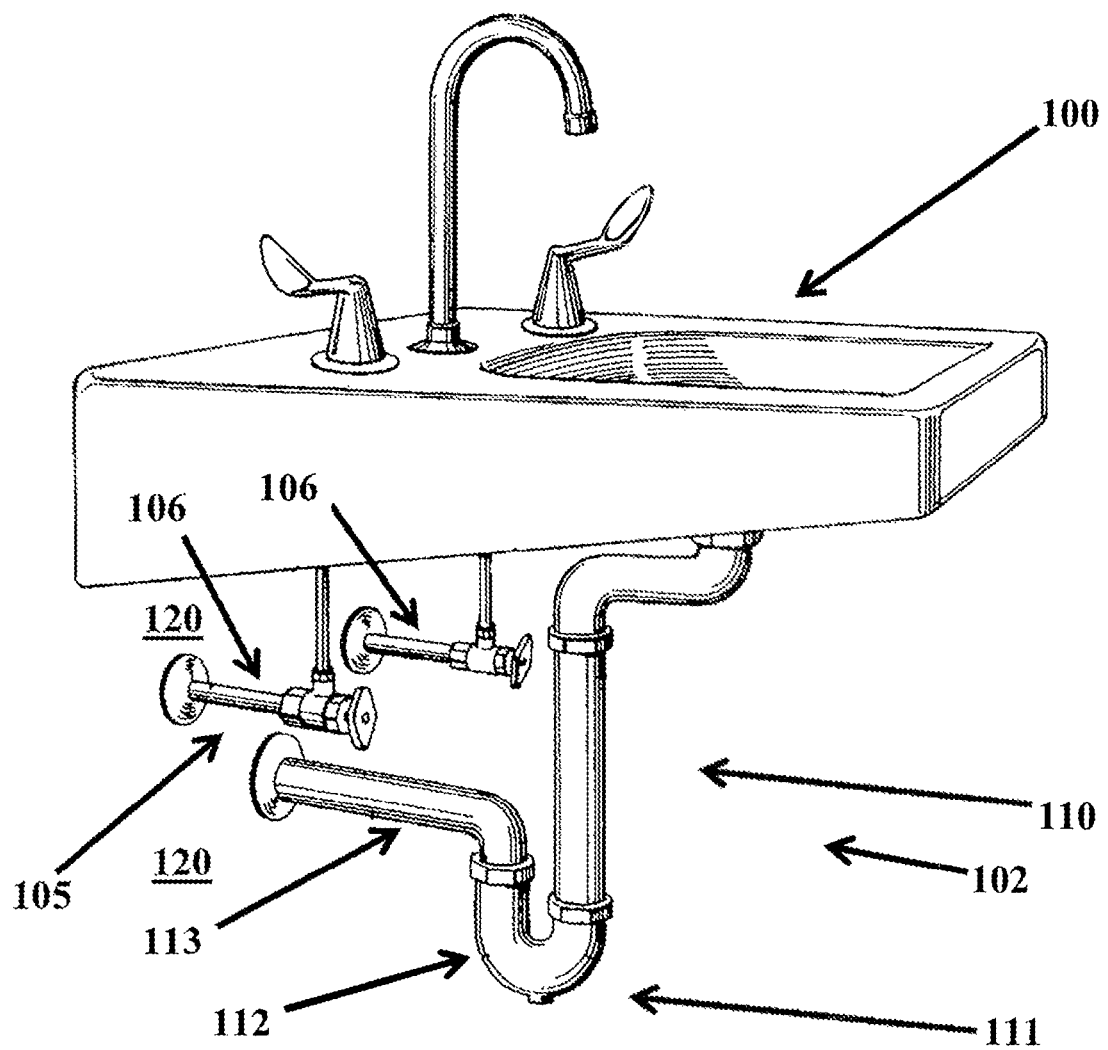
FIG. 1 is a typical commercial sink with exposed undersink piping.
Figure 2A:
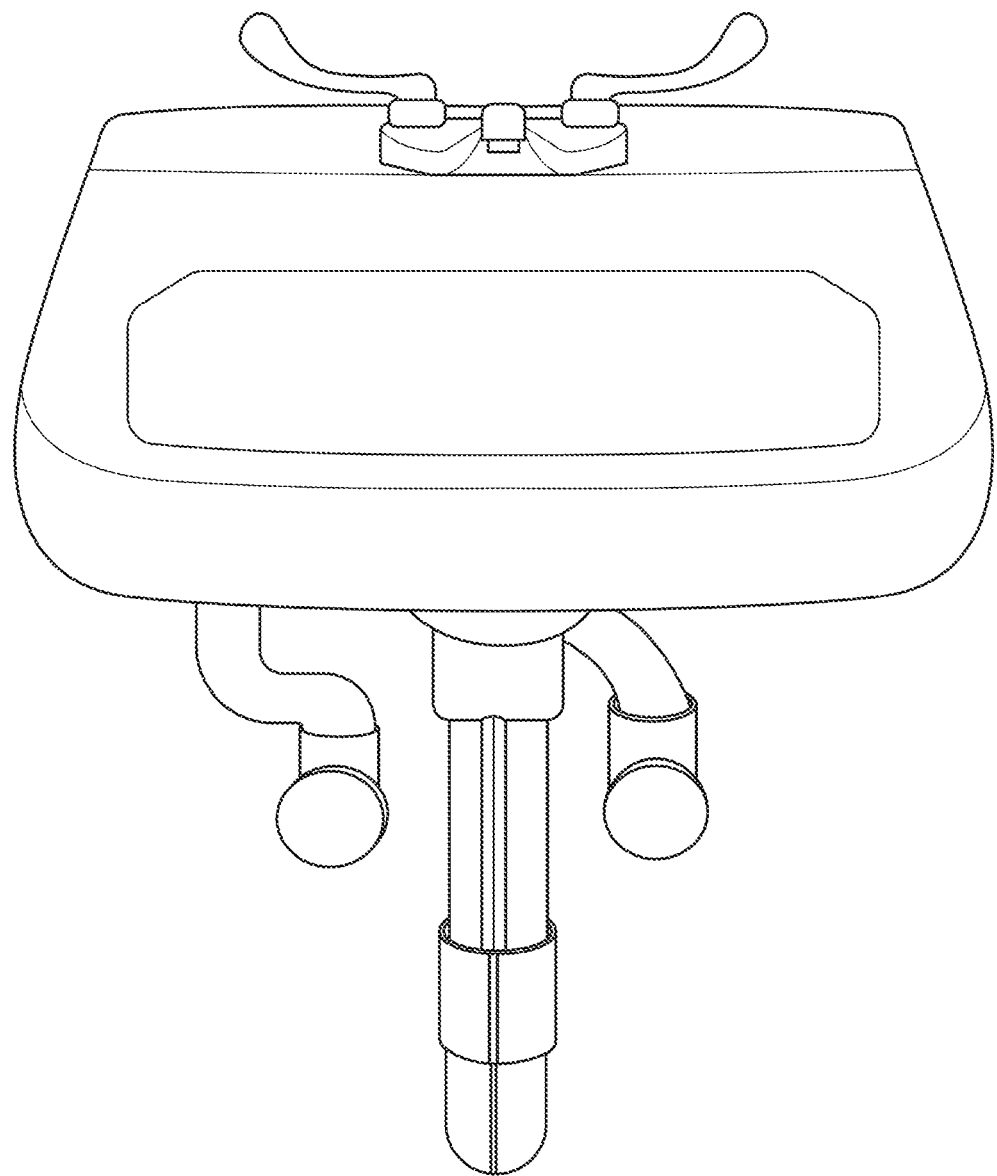
FIG. 2A is a front perspective view of a system of pipe-insulating sleeves, according to a first embodiment of the invention, the sleeves as shown being installed beneath a sink.
Figure 2B:
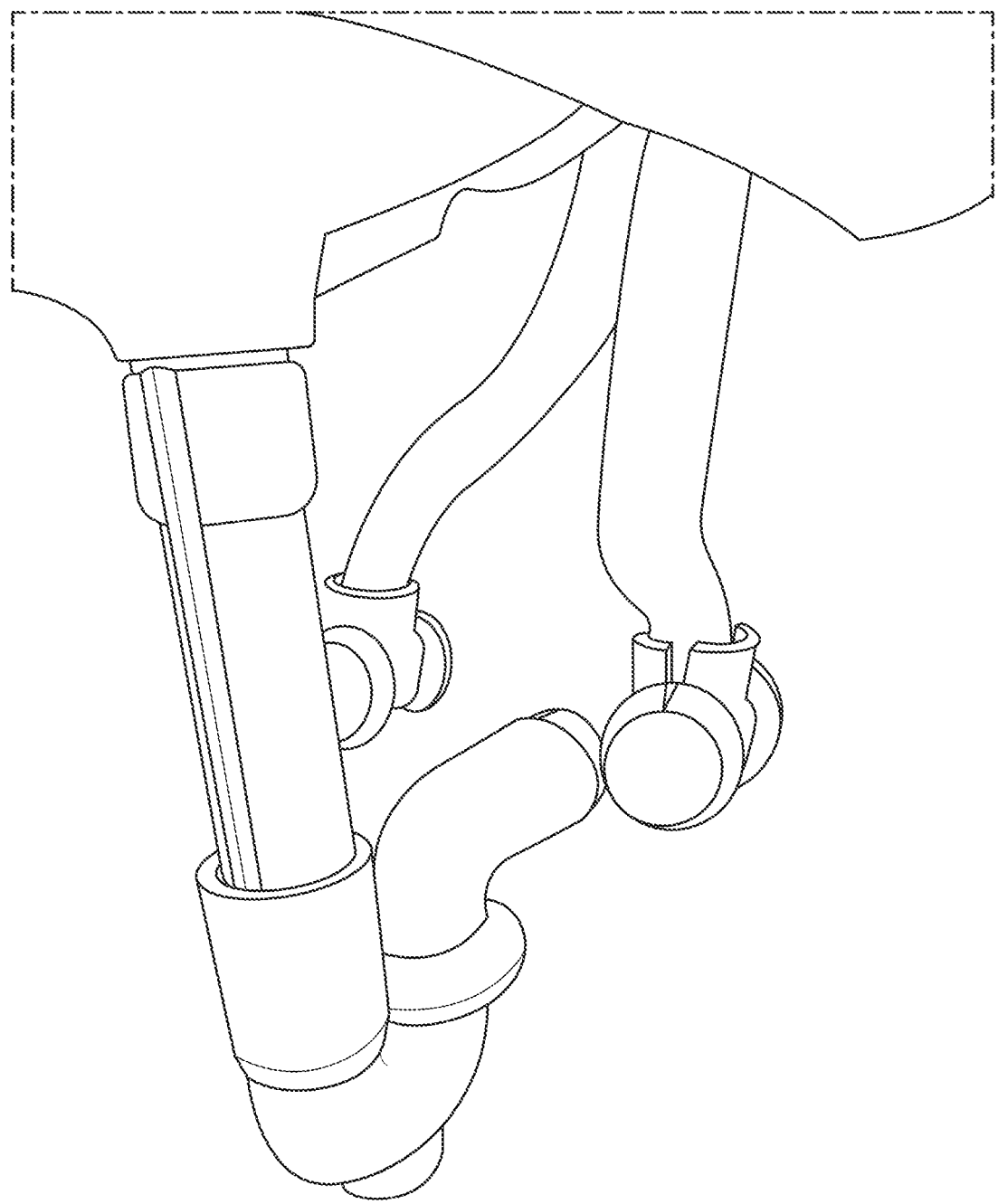
FIG. 2B is a perspective view of the system of pipe-insulating sleeves as shown in FIG. 2A.
Figure 2C:
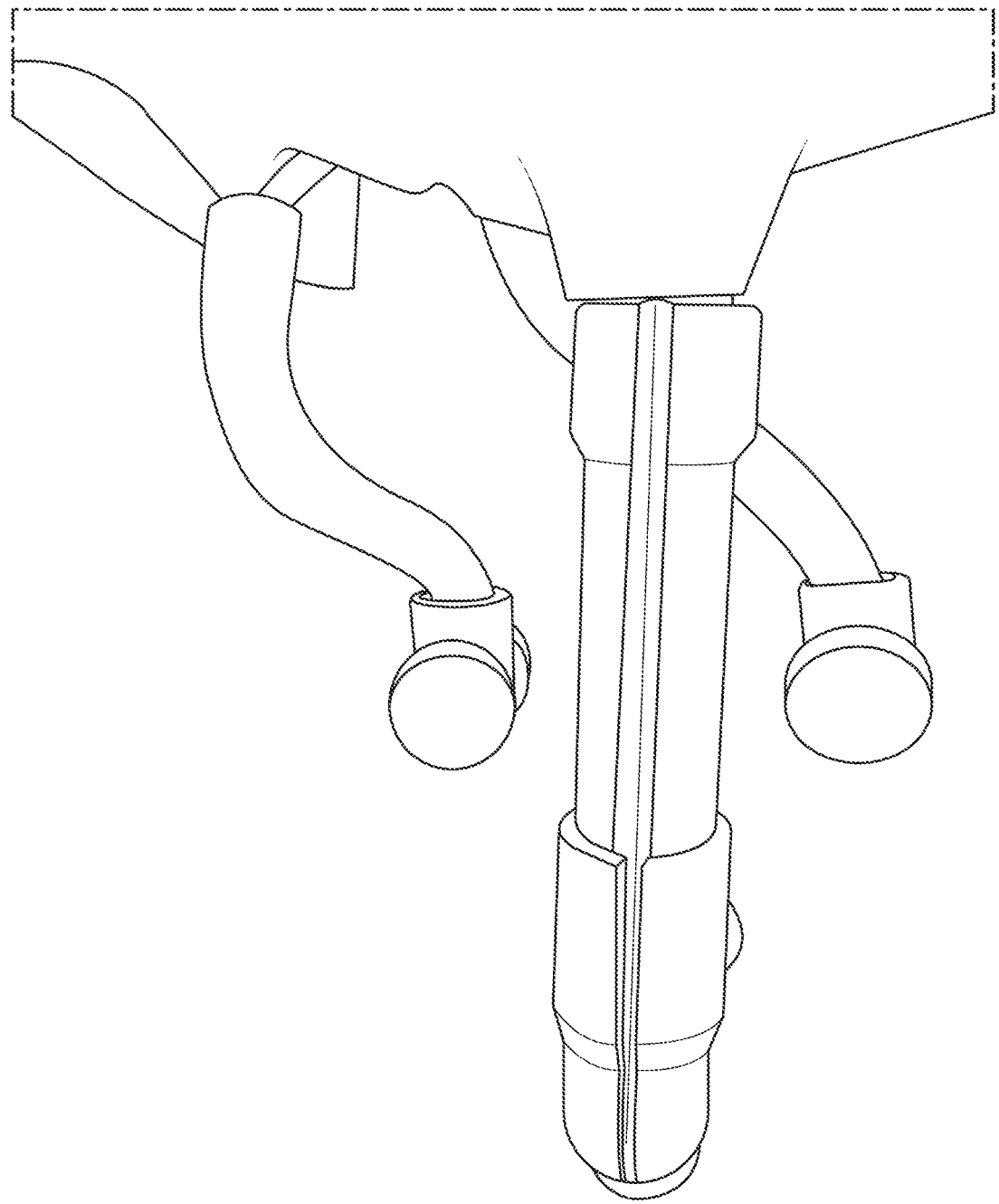
FIG. 2C is a front zoomed view of the system of pipe-insulating sleeves as shown in FIG. 2A.
Figure 2D:
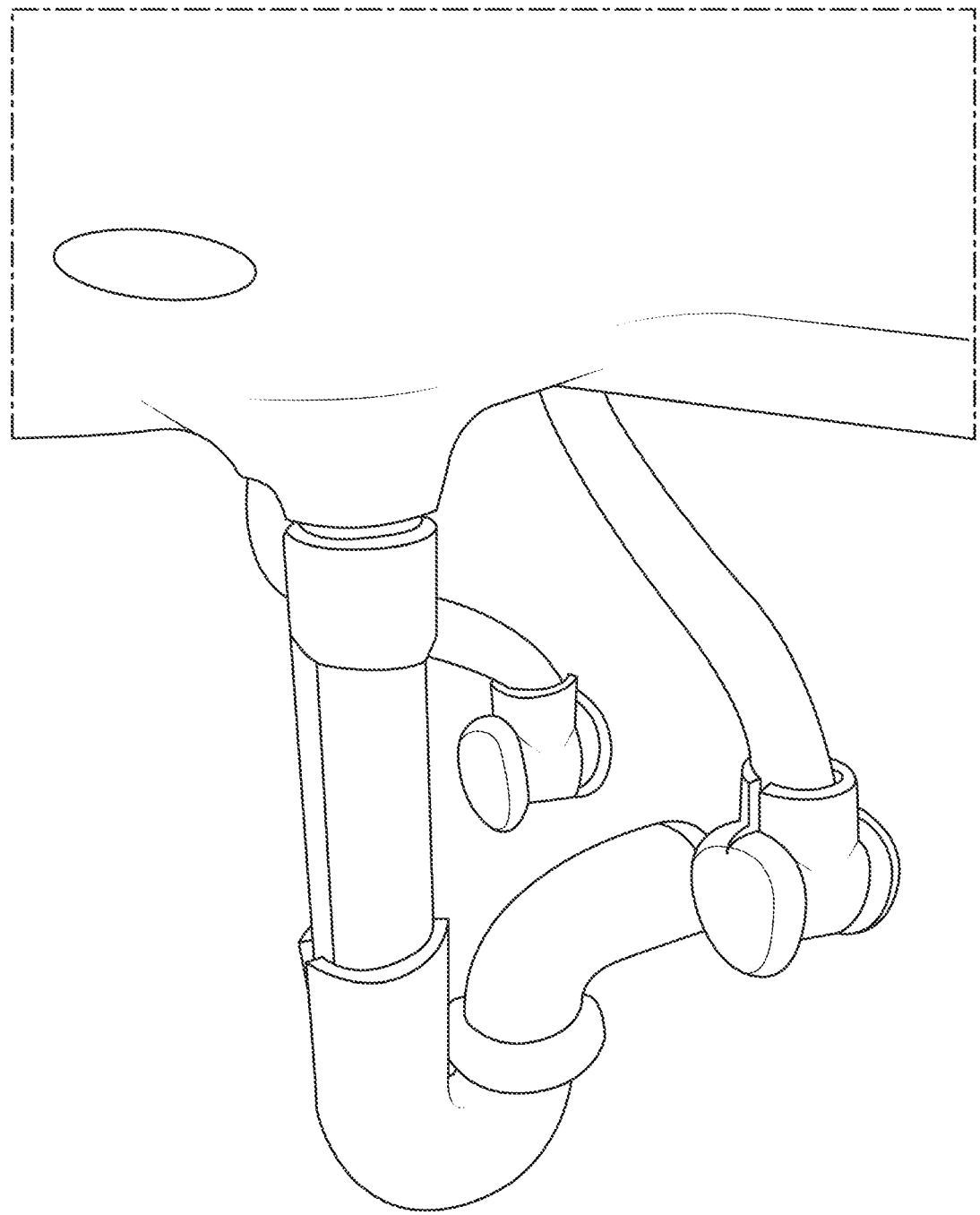
FIG. 2D is a side perspective view of the system of pipe-insulating sleeves as shown in FIG. 2A.

FIG. 1 illustrates a typical commercial sink (100) with exposed undersink piping (102), as it would typically be found in a commercial or public restroom. As shown in the Figure, the undersink piping (102) may generally be divided into two distinct sets: the drain piping (110) and the water supply piping (105). The drain piping (110), which comprises a P-trap (111), extends from the drain in the sink (not depicted) and terminates in the wall (120), wherein it generally joins with a wastewater system of the building (not depicted). As illustrated in FIG. 1, the P-trap (111) generally includes a vertical pipe section (110) which extends downwardly from the drain in the sink and extends below the sink to couple with a J-shaped pipe section (112). The J-shaped pipe section (112) makes a 180° bend and then extends vertically upward to couple with an L-shaped pipe section (113), which itself makes a 90° bend from the J-shaped section (112) to extend generally horizontally into the wall (120). The water supply piping (105) comprises two supply lines (106), commonly referred to as supply water angle valves, which separately supply both hot and cold water to the sink (100). As illustrated in FIG. 1, the supply lines (106) extend generally horizontally from the wall (120) to connect to a respective valve and faucet line section (107) that extends generally vertically upward from each valve (or supply stop) (108) to connect to the faucet apparatus (101) of the sink (100).

Unlike existing pipe sleeve systems, the pipe insulating sleeves of the present invention are generally characterized by a hinged design (also known as a "butterfly" design) that enables them to be hingedly opened so as to easily and conveniently accommodate a desired pipe section therein. The hinged design comprises a hinged joint on an outer portion of the sleeve. The hinged joint bifurcates each of the sleeves into two generally symmetrical halves which may rotate relative to one another about an axis defined by the hinged joint. The two halves may selectively rotate so as to define 1) a closed configuration, where the halves have not been rotated relative to one another about the hinged joint, 2) a partially open configuration, where the halves define a rotation therebetween of up to 180 degrees, and 3) a fully open configuration where the halves define a rotation therebetween of 180 degrees or greater. Opposite the hinged joint on the sleeves is an open (or separated) end, where each of the sleeve halves may touch one another when in the closed configuration. The pipe sleeves of the present invention are configured to laterally receive the undersink pipe sections along a direction transverse to the pipe's axis of elongation. However, it is contemplated that the pipe sleeves may receive the pipes longitudinally along the pipe length by sliding the sleeve along the length of pipe—although one of skill in the art will appreciate that such applications may be limited to adjustment of the pipe sleeves along the pipe, as well as to inserting pipe sleeves onto an open end of a pipe or a valve.

It should be noted that the halves, although generally symmetrical are not identical, mirror images of one another. As but one example, and as will be described in greater detail below, each sleeve half will differ from the other half connected at the hinged joint by virtue of complementary fastening mechanisms carried by the respective halves. The complementary fastening mechanisms are configured to interact with one another so as to releasably fix the sleeve's halves in the closed configuration.

Advantageously, and by virtue of the hinged joint, the two halves may rotate relative to one another within the partially open configuration up to the fully open configuration so as to easily and conveniently receive a portion of the undersink pipe section within the sleeve. Because there is no biasing force at the hinged joint that urges the sleeves into the closed configuration, a user can easily adjust the degree of angulation of the sleeve halves using a single hand so as to 1) easily receive the pipe section within the sleeve, and 2) capture and retain the pipe utilizing the fastening mechanisms described in greater detail below with respect to each sleeve. It will be understood that the sleeves of the present invention need not define the fully open configuration in order to receive the pipe section therein, and that a sufficient degree of angulation between the two halves in the partially open configuration will adequately receive and capture the pipe.

FIGS. 2A-2D depict a system of pipe-insulating sleeves, according to a first embodiment of the invention. As shown in the Figures, the pipe insulating sleeves cooperate with one another in series to define the system. As will be described in further detail below, the various sleeve sections may selectively overlap, capture, or interact with one another so as to cooperatively and removably be joined to one another in series. The system of pipe insulating sleeves are designed to have a smooth, streamlined, and aesthetically pleasing appearance, and the connective joints between the various connecting individual pipe sleeves are designed to minimize heat loss so as to maintain the heat insulating integrity of the system. As shown in the various FIGS. 2A-2D, the system includes both drain sleeves and supply sleeves.

Figure 3A:
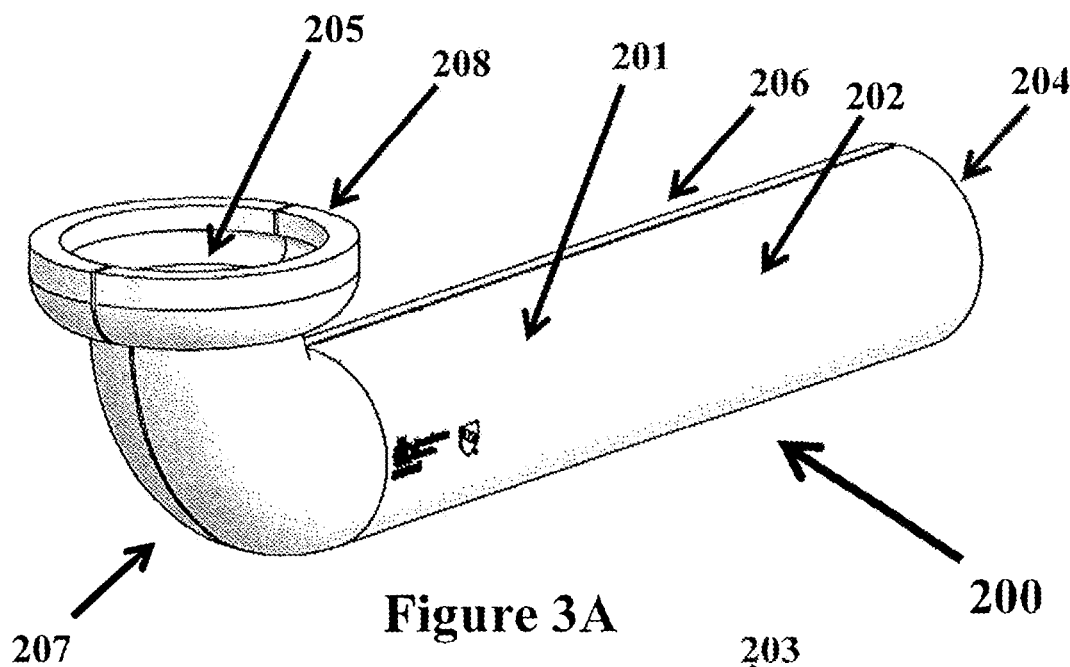
FIG. 3A is a perspective view of an L-shaped pipe insulating sleeve according to a first embodiment of the invention, wherein the sleeve is in a closed configuration.
Figure 3B:
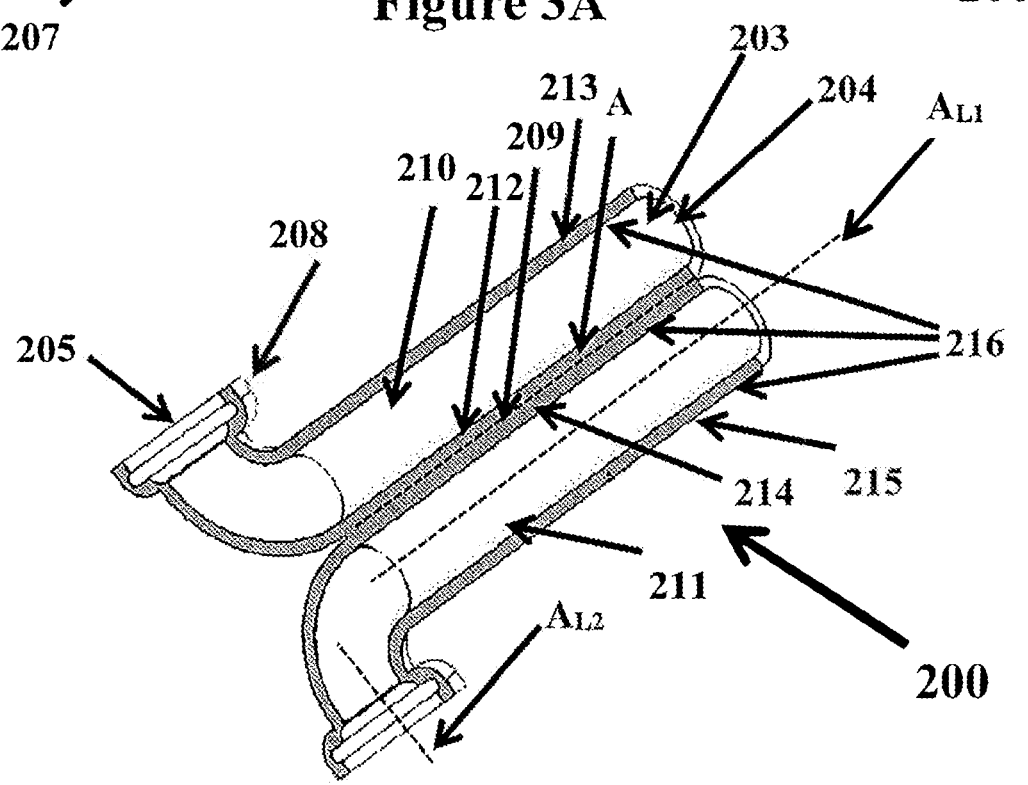
FIG. 3B is a perspective view of the L-shaped pipe insulating sleeve as shown in FIG. 3A, wherein the sleeve is in an open configuration.
Figure 3C:
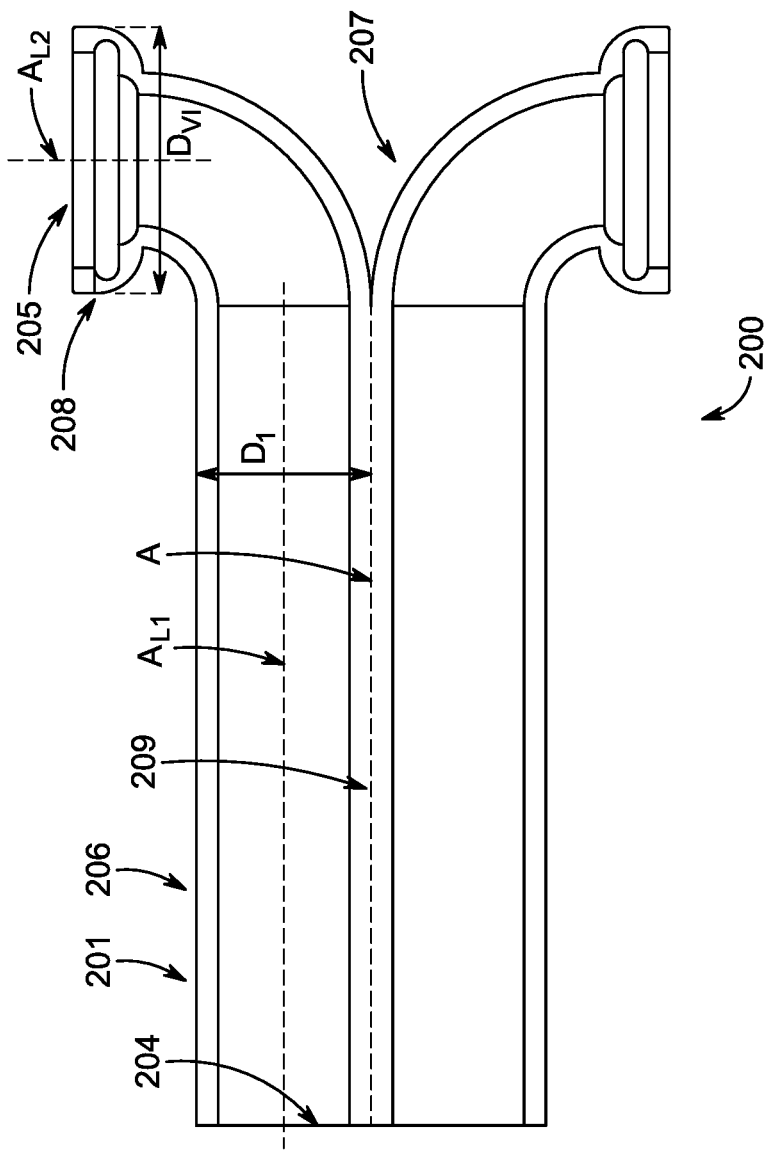
FIG. 3C is front-plan view of the L-shaped pipe insulating sleeve as shown in FIG. 3B.

FIGS. 3A-3C depict an L-shaped pipe insulating sleeve ("L-sleeve") (200) according to a first embodiment of the invention. The L-sleeve (200) is sized and configured to accommodate the L-shaped pipe section from the P-trap (see FIG. 1) within a hollow interior portion of the L-sleeve (200). Accordingly, the L-sleeve (200) in an installed configuration will encase the L-shaped pipe section along a substantial entirety of its length along an axis of elongation. Although an L-sleeve (200) is shown in FIGS. 3A-3C for illustrative purposes, one of ordinary skill in the art will readily understand that the L-sleeve (200) could alternatively assume any shape necessary to accommodate an undersink pipe needing to be insulated. In that respect, aside from the shape of the pipe itself, such alternatively-shaped pipe would otherwise have the same features as the L-sleeve (200) as described herein. The term "substantially" is intended to mean considerable in extent or largely but not necessarily wholly that which is specified.

With reference to FIG. 3A, which depicts a perspective view of the L-sleeve (200) in the closed configuration, the L-sleeve (200) generally defines a hollow tubular body (201) having a tubular (or rounded) outer surface (202) and an opposed interior surface (203) that is defined by the hollow interior portion. Similar to the L-shaped pipe section (113) received within the hollow interior portion of the L-sleeve (200), the tubular body of the L-sleeve (200) forms a shape similar to an elongated letter "L." The body (201) of the L-sleeve (200) extends substantially along a tubular axis of elongation from a first end to a second end. The first and second ends define respective first and second openings (204, 205) that are elongate about respective first and second axes ($A_{L1}$, $A_{L2}$), the openings being in open communication with the hollow interior portion of the sleeve. The first and second axes ($A_{L1}$, $A_{L2}$) are substantially perpendicular to one another.

With reference now to FIGS. 3A and 3B, the hollow tubular body (201) of the L-sleeve (200) includes a straight portion (206) and a bent portion (207). The straight portion (206) extends from the first opening (204) at the first end, up until the bent portion (207), and the bent portion (207) extends from the straight portion (206) up to the second opening (205) at the second end. Furthermore, the bent portion (207) of the tubular body (201) adjacent the second end defines a first coupler (208), the first coupler (208) being characterized by a radially expanded (with respect to the second axis ($A_{L2}$)) or widened portion. As illustrated particularly in FIG. 3C, the straight portion (206) of the tubular body (201), as well as the bent portion (207) of the tubular body (201) near the straight portion (206), has a substantially uniform diameter $D_1$ along its length. The first coupler has an expanded, variable diameter $D_{V1}$ along its length that is greater than $D_1$. As will be described in greater detail below, the first coupler (208) is sized and configured to mate with a complementary coupler mechanism on another pipe insulating sleeve of the present invention so as to detachably couple the L-sleeve (200) to another sleeve.

With continuing reference to FIGS. 3B and 3C, the tubular body (201) of the L-sleeve (200) includes a first hinged joint (209) adjacent the tubular outer surface (202) at the straight portion (206). The first hinged joint (209) bifurcates the tubular body (201) of the L-sleeve (200) into a first half (210) and a second half (211), the halves being hingedly connected at the first hinged joint (209) and rotatable relative to one another about an axis (A) defined by the first hinged joint (209).

The first half (210) defines first and second edges (212, 213) that are substantially planar with one another, the first and second edges (212, 213) each extending substantially perpendicular to the first axis ($A_{L1}$), where the first edge (212) extends from the first hinged joint (209) to the opposed interior surface (203), and where the second edge (213) extends from the tubular outer surface (202) to the opposed interior surface (203). The second half (211) defines third and fourth edges (214, 215) that are substantially planar with one another, the third and fourth edges (214, 215) each extending substantially perpendicular to the first axis ($A_{L1}$), where the third edge (214) extends from the first hinged joint (209) to the opposed interior surface (203), and where the fourth edge (215) extends from the tubular outer surface (202) to the opposed interior surface (203). The first and third edges (212, 214), which as noted above are connected to one another by the first hinged joint (209), define a first angle therebetween. It is noted that the second and fourth edges (213, 215) will abut one another only when the first and second halves (210, 211) of the tubular body (201) of the L-sleeve (200) are in the closed configuration.

The first half (210) and second half (211) are substantially symmetrical with one another about a plane intersecting the first hinged joint (209) and intersecting the first and second axes ($A_{L1}$, $A_{L2}$) when the L-sleeve (200) is in the closed configuration. The first and second halves (210, 211) are distinguishable, however, in that they each carry a different set of complementary fastening mechanisms (216). As shown in FIG. 3B, the first and second halves may include complementary halves of a hook-and-loop fastening system, such as, for example Velcro® brand fasteners. When the first and second halves (210, 211) are fastened to one another by the fastening mechanisms (216), it will create a relatively streamlined, low-profile, and aesthetically appealing appearance of the outer surface (202) of the sleeve. It is understood that application of the fastening mechanism (216) when closing the L-sleeve (200) will provide an additional measure of retention to both keep the L-sleeve (200) closed and to further retain the pipe within the hollow interior of the L-sleeve (200). It is further understood that, in order to release the fastening mechanism (216), a user will need to apply sufficient force to separate the fastening mechanisms (216) and thereby open the L-sleeve (200) to adjust its positioning or to remove the pipe therefrom.

Figure 11A:
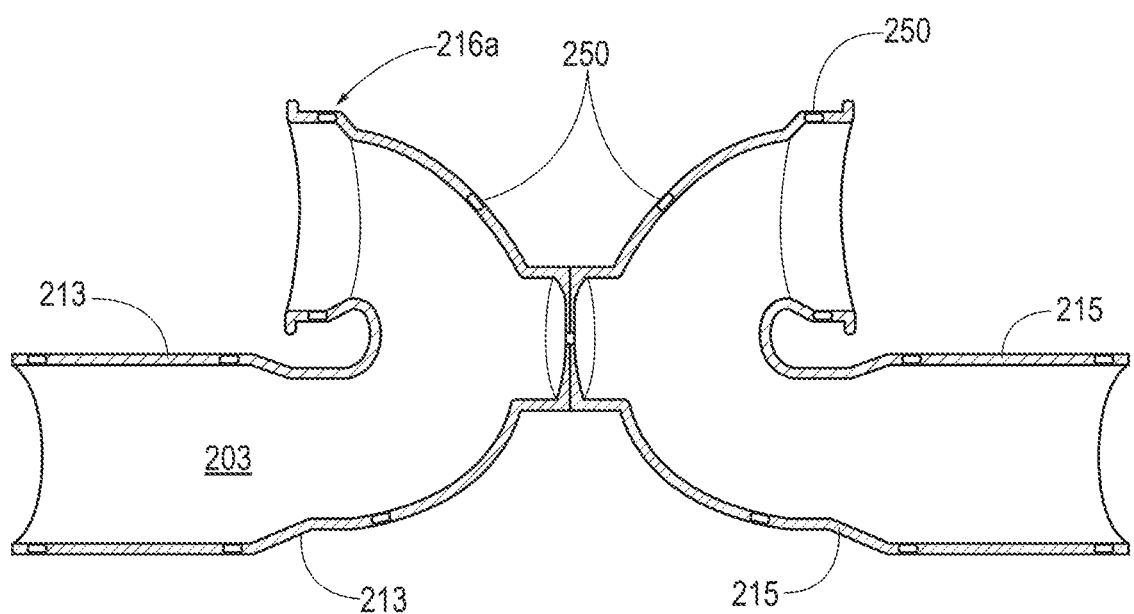
FIG. 11A is a perspective view of a pipe insulating sleeve according to another embodiment.
Figure 11B:
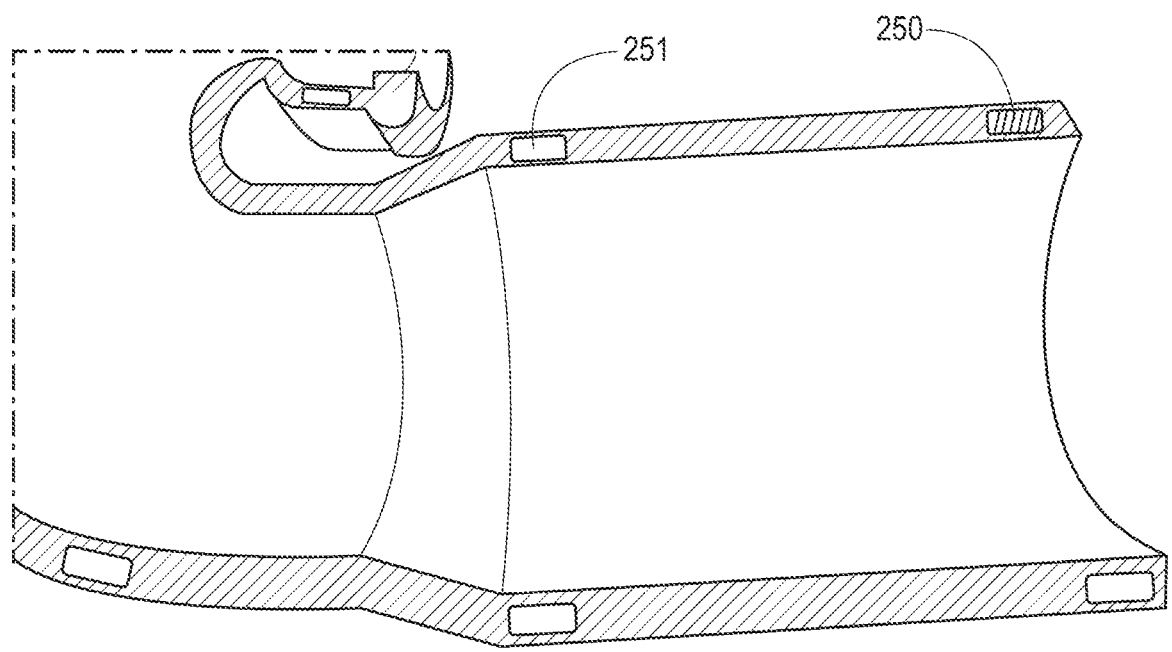
FIG. 11B is a zoomed, perspective view of the pipe insulating sleeve as shown in FIG. 11A.

Other fastening mechanisms (216) may be used. For example, as illustrated in FIGS. 11A-11B, magnetic closure devices (216a) may be substituted for the hook-and-loop design of the previously described embodiment. The magnetic closure devices (216a) further comprise an array of individual magnets (250), which may be installed within the second and fourth edges (213, 215) of the sleeve, where one edge will contain magnets (250) of opposite polarity from the magnets (250) of the opposing edge. As one of skill in the art will understand, magnets of opposite polarities (i.e., positive and negative charges) will attract one another. In some embodiments, the individual magnets (250) may be inserted into a completed pipe sleeve by removing small portions of material from the second and fourth edges (213, 215) to create pits (251, see FIG. 11B), inserting the magnets (250), and bonding them to the sleeve within the pits (251) by using an adhesive (such as polymer cement, glue, or the like). In other embodiments, the magnets may be inserted into a pipe sleeve injection mold such that the foam, once hardened in the mold, may be formed about the entirety of the magnet's outer surface. One of skill in the art will appreciate that after the completed sleeve with magnets (250) has hardened within the injection mold, refinement to the second and fourth edges (213, 215) so as to expose a surface of the magnets (250) at the respective edge's surface.

Regardless of the method of introducing the magnets (250) into the sleeve edges, the magnets (250), as illustrated, should fit entirely within the respective second and fourth edges (213, 215) such that no portion of the magnets (250) protrude outwardly into the inner or outer surfaces (203, 202) of the sleeve. Therefore, the magnets (250) should be sufficiently small in the direction of the sleeve's thickness (measured in a direction between the outer surface (202) and the opposing inner surface (203)) in order to recess entirely within the limited thickness of the sleeve. To compensate for this constraint, the magnets (250) may have an increased length and depth, respectively, in the two directions perpendicular to the thickness (i.e., and with reference to FIG. 11A, the directions running from Left to Right and In to Out of the plane of the figure) so as to maximize the total volume of the magnet (250). It is understood that the depth of any given magnet (250) may be limited, in part, by the curvature of the pipe sleeve. Because undersink pipes are typically 1.5 inches in diameter, a prismatic magnet (250) will have a limited depth, so as to avoid protruding from either one of the inner or outer surfaces (203, 202) of the sleeve. Length of the magnets (250) may typically be limited by the geometry of the pipe sleeve in question, wherein a long edge may accommodate a potentially longer magnet (250), while the opposite may be true of a shorter edge.

On a higher level, one of skill in the art will readily appreciate that magnetic field strength of a magnet is partly a function of the total volume of a magnetic material, so maximizing the volume of the magnets (250) is desirable. It is further desirable that the magnets (250) of the illustrated embodiment will have high magnetic field strength, characterized by a large magnetic flux distributed evenly across the exposed surface area of the magnets (250), shown in FIGS. 11A and 11B. The high magnetic flux will permit strong attractive forces between magnets (250) of opposite polarities, which will advantageously keep the sleeve in the closed configuration about the circumference of the pipe.

In the embodiment illustrated in FIG. 11A, a total of 8 magnetic closure devices (216a) have been fitted within each one of the first and second halves (210, 211). However, it is appreciated that other numbers of magnetic closure device (216a) may be utilized as needed, given such factors as the size of the sleeve, the strength of the selected magnets, and the desired spacing between the magnets. Insofar as spacing between the magnets is concerned, the magnets in the illustrated embodiment are spaced approximately 1-2 inches apart, as measured along the respective edge (213, 215) in which they are embedded. In general, the spacing between adjacent magnets, along the edge, should be adequate to permit ease of separation when a user desires to open the sleeve, for example during installation or removal from an underlying pipe. Accordingly, it may be desirable to have the magnets (250) spaced sufficiently from one another to permit a user's fingers to pass between the adjacent magnets so as to facilitate mechanical, hand-separation.

In still other embodiments, the fastening mechanisms (216) may comprise a plurality of external tabs that extend from the tubular outer surface near the first and second edges, while the second half includes a plurality of complementary slots that extend into the hollow tubular body from the tubular outer surface to the opposed interior surface. The plurality of tabs are configured to cooperate with the plurality of slots to fix the first and second halves in the closed configuration. Advantageously, when each of the plurality of tabs are fully received within the corresponding plurality of slots, the tubular outer surface maintains a fairly consistent circumference along the length of the L-sleeve, and the fully received, or inserted, tabs are substantially flush with the outer tubular surface of the pipe body. In other words, each of the plurality of tabs may be received in the corresponding plurality of slots such that the tubular outer surface maintains a consistent outer diameter as well as a streamlined, low-profile, and aesthetically appealing appearance.

FIGS. 4A-4D depict a J-shaped pipe insulating sleeve ("J-sleeve") (300) according to a first embodiment of the invention. The J-sleeve (300) is sized and configured to accommodate the J-shaped pipe section (112) from the P-trap (see FIG. 1) within a hollow interior portion of the J-sleeve (300). Thus, the J-sleeve (300) in an installed configuration will encase the J-shaped pipe section (112) along a substantial entirety of its length along a parabolic axis of elongation. Furthermore, the J-sleeve (300) is configured to be selectively securable to the L-sleeve (200) (described above). Although a J-sleeve (300) is shown in FIGS. 4A-4D for illustrative purposes, one of ordinary skill in the art will readily understand that the J-sleeve (300) could alternatively assume any shape necessary to accommodate an undersink pipe needing to be insulated. In that respect, aside from the shape of the pipe itself, such alternatively-shaped pipe would otherwise have the same features as the J-sleeve (300) as described herein, including the ability to couple to another pipe insulating sleeve connected in series, as will be described below.

Figure 4A:
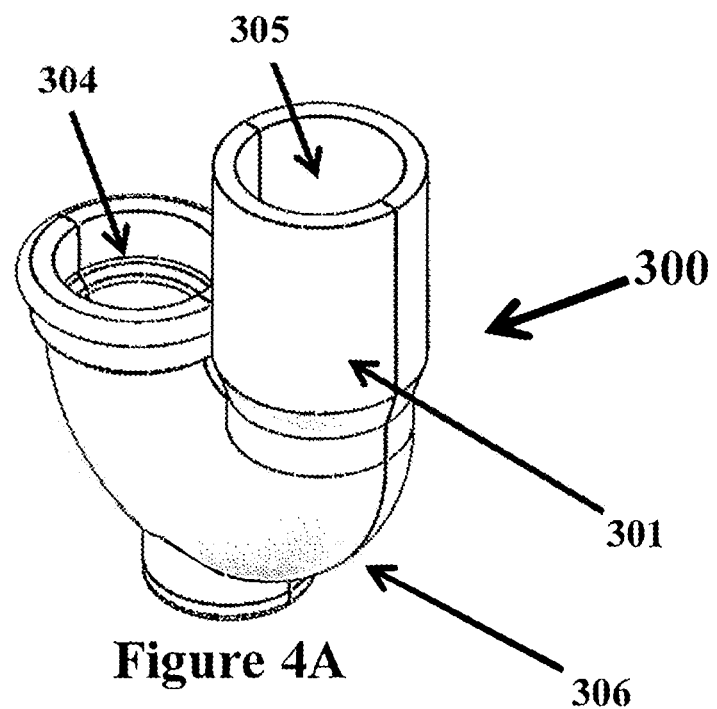
FIG. 4A is a perspective view of a J-shaped pipe insulating sleeve according to a first embodiment of the invention, wherein the sleeve is in a closed configuration.
Figure 4B:
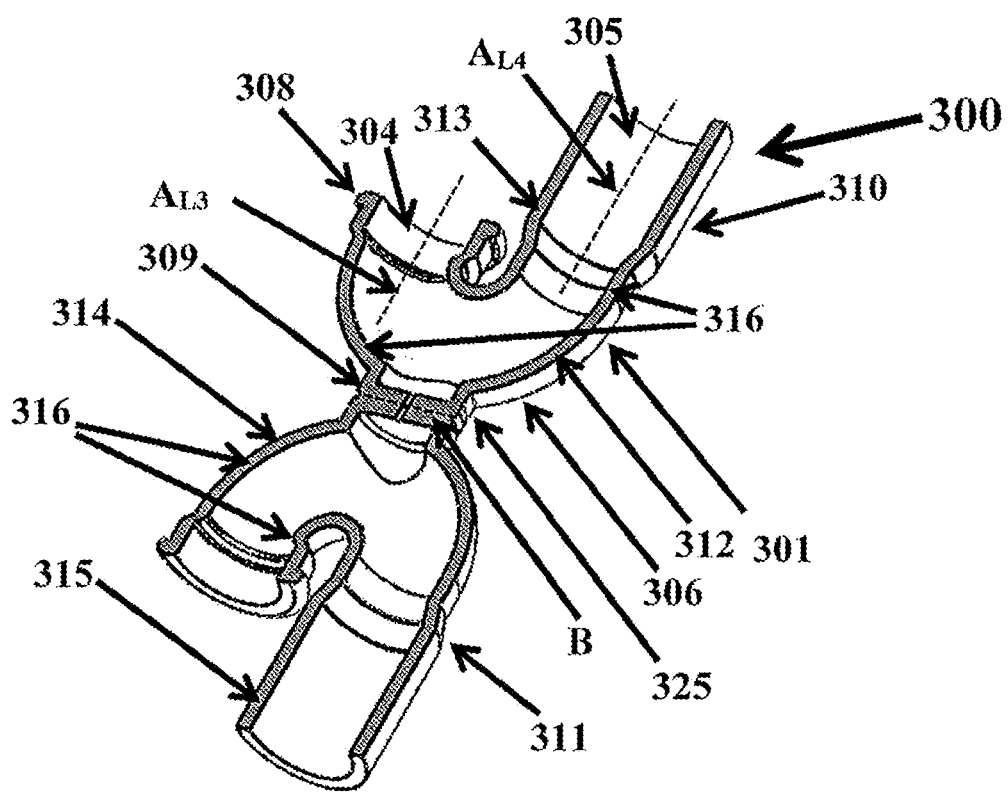
FIG. 4B is a perspective view of the J-shaped pipe insulating sleeve as shown in FIG. 4A, wherein the sleeve is in an open configuration.

With reference to FIG. 4A, which depicts a perspective view of the J-sleeve (300) in the closed configuration, the J-sleeve (300) generally defines a parabolically-shaped body (301) having a tubular (or rounded) outer surface (302) and an opposed interior surface (303) (see FIG. 4B) that is defined by the hollow interior portion of the J-sleeve (300). Similar to the J-shaped pipe section (112) received within the hollow interior portion of the J-sleeve (300), the parabolically-shaped body (301) of the J-sleeve (300) forms a shape similar to a letter "J." The body (301) of the J-sleeve (300) extends generally from a third end to a fourth end. The third and fourth ends define respective third and fourth openings (304, 305) that extend into the tubular body (301) of the J-sleeve (300) along respective third and fourth axes ($A_{L3}$, $A_{L4}$). As shown in FIG. 4B, the third and fourth axes are substantially parallel to one another. As further shown in FIGS. 4A and 4B, the third and fourth openings are in open communication with the hollow interior portion of the J-sleeve (300).

With continuing reference to FIGS. 4A-4C, the hollow parabolically-shaped body of the J-sleeve (300) includes a bottom-bent portion (306) disposed between the third and fourth axes and connecting the third and fourth ends together. At a bottom-most area of the bottom-bent portion (306), the J-sleeve (300) includes a tubular projection (325). When the J-sleeve (300) is disposed on the J-shaped pipe section (112) of the P-trap, the tubular projection (325) extends downwardly directly from the bottom-most portion of the J-shaped pipe section. Because the tubular projection (325) exists at the lowest point of the P-trap assembly when installed in accordance with a method of the invention, the tubular projection comprises a cleanout. The cleanout will accumulate and dispose of any water or moisture that is gravitationally directed along the outside of the pipe sections that are encased within the sleeves. As shown best in FIG. 4C, the cleanout has a flat, bottom surface that includes a small through bore. Therefore, when the J-sleeve (300) is in the closed configuration and the J-shaped pipe section (112) is disposed within the J-sleeve (300), water and/or moisture will be directed into the cleanout and out of the J-sleeve (300) via the through bore. The elimination of excess moisture from inside the J-sleeve (300) will discourage the growth of bacteria, mold, or mildew. However, as described in greater detail below with regard to the material properties of the sleeves of the present invention, the sleeves possess other antifungal and antibacterial properties which further discourage the buildup of mold and bacteria.

With reference now to FIG. 4C, the third end of the parabolically-shaped body (301) near the third opening (304) defines a second coupler (308), the second coupler (308) being characterized by a radially expanded (with respect to the third axis ($A_{L3}$)) or widened portion. The fourth end of the parabolically-shaped body near the fourth opening (305) defines a third coupler (307), the third coupler (307) being characterized by a radially expanded (with respect to the fourth axis) or widened portion. With continuing reference to FIG. 4C, the bottom bent portion (306) of the parabolically-shaped body (301), as well as portions of the third and fourth ends near the bent portion (306), has a substantially uniform diameter $D_2$ along its length. The second coupler has an expanded, variable diameter $D_{V2}$ along its length that is greater than $D_2$. As will be described in greater detail below, the second coupler is sized and configured to mate with a complementary coupler mechanism on another pipe insulating sleeve of the present invention. More particularly, the second coupler is configured to couple to (or otherwise be received by) the first coupler of the L-sleeve (200) so as to detachably connect the J-sleeve (300) to the L-sleeve (200).

With continuing reference to FIG. 4C, the parabolically-shaped body of the J-sleeve (300) includes a second hinged joint (309) adjacent the tubular outer surface (301) at the tubular projection (325). The second hinged joint bifurcates the parabolically-shaped body of the J-sleeve (300) into a first half and a second half (310, 311), the halves (310, 311) being hingedly connected at the second hinged joint (309) and rotatable relative to one another about an axis (B) defined by the second hinged joint (309).

The first half (310) defines fifth and sixth edges (312, 313) that are substantially planar with one another, where the fifth edge (312) extends from the second hinged joint (309) and the tubular outer surface (302) to the opposed interior surface (303), and where the sixth edge (313) extends from the tubular outer surface (302) to the opposed interior surface (309). The second half (311) defines seventh and eighth edges (314, 315) that are substantially planar with one another, where the seventh edge (314) extends from the second hinged joint (309) and the tubular outer surface (302) to the opposed interior surface (303), and where the eighth edge (315) extends from the tubular outer surface (302) to the opposed interior surface (303). The fifth and seventh edges (312, 314), which as noted above are partly connected to one another by the second hinged joint, define a second angle therebetween. It is noted that the sixth and eighth edges (313, 315) will abut one another only when the first and second halves of the parabolically-shaped body of the J-sleeve (300) are in the closed configuration.

The first half and second halves (310, 311) are substantially symmetrical with one another about a plane intersecting the second hinged joint (309) and intersecting the third and fourth axes ($A_{L3}$, $A_{L4}$) when the J-sleeve (300) is in the closed configuration. The first and second halves (310, 311) are distinguishable, however, in that they each carry a different set of complementary fastening mechanisms (316). As best shown in FIG. 4B, the first and second halves (310, 311) include complementary halves of a hook-and-loop fastening system, such as, for example Velcro® brand fasteners. When the first and second halves (310, 311) are fastened to one another by the fastening mechanisms (316), it will create a relatively streamlined, low-profile, and aesthetically appealing appearance of the outer surface (302) of the sleeve. It is understood that application of the fastening mechanism (316) when closing the J-sleeve (300) will provide an additional measure of retention to both keep the J-sleeve (300) closed and to further retain the pipe within the hollow interior of the J-sleeve (300). It is further understood that, in order to release the fastening mechanism (316), a user will need to apply sufficient force to separate the fastening mechanisms (316) and thereby open the J-sleeve (300) to adjust its positioning or to remove the pipe therefrom.

With reference now to FIGS. 5A-5D, a supply line pipe insulating sleeve (400) is illustrated in various views. FIG. 5A illustrates a closed sleeve (supply pipe not shown for clarity), while FIG. 5B illustrates the same sleeve in an open configuration. As shown the supply line pipe insulating sleeve (400) may comprise a generally straight body (401) that is elongate along a central axis ($A_{L4}$). The supply line pipe insulating sleeve (400), like those described previously, has a hollow interior portion that is configured to receive the underlying supply pipe. Of course, one of skill in the art will readily appreciate that although the supply line pipe insulating sleeve (400) may be utilized for a supply pipe, its use is not so limited and it may alternatively be used for any other pipe that is desired to be insulated. Additionally, the supply line pipe insulating sleeve (400) may comprise other orientations that are not substantially elongate, as illustrated. Such other orientations may include a bent design, an angled design, or other similar orientations. Similar to the J-sleeve (300) and L-sleeve (200) described above, the supply line pipe insulating sleeve (400) may be coupled to other adjoining pipe insulating sleeves in series with it as part of a larger system (see, e.g., FIGS. 2A-2D).

As illustrated particularly in FIGS. 5B-5D, the supply line pipe insulating sleeve (400), like those previously described herein, is capable of opening up to (and beyond) 180° about an axis defined by a hinge (401). Such large degree of opening is advantageous to easily and conveniently accommodate a pipe within the sleeve without needing to manually split (or otherwise open) the sleeve. Like the previously-described sleeves, the supply pipe insulating sleeve (400) consists of first and second halves (402, 403) that are generally bifurcated by the hinge (401) separating them. As mentioned previously, the halves (402, 403) of the supply line pipe insulating sleeve (400) are capable of rotation about an axis (C) defined by that hinge. Further, and as shown in FIG. 5B, the halves (402, 403) may each be fitted with a fastening mechanism (404), such as a hook-and-loop system as previously described, to facilitate retaining the supply pipe insulating sleeve in a closed configuration. Once the sleeve is closed and retained by the fastening mechanism (404), in order to open the sleeve for removal or adjustment, the user will need to apply sufficient force to overcome the retaining force of the fastening mechanisms (404).

With reference now to FIGS. 6A-6D, a supply stop pipe insulating sleeve (500) is illustrated in various views. FIG. 6A illustrates a closed sleeve (supply stop not shown for clarity), while FIG. 6B illustrates the same sleeve in an open configuration. As shown the supply stop pipe insulating sleeve (500) may comprise a short body that terminates in a closed portion (509). The supply stop pipe insulating sleeve (500), like those described previously, has a hollow interior portion that is configured to receive the underlying supply stop. The supply stop pipe insulating sleeve (500) may comprise other orientations and sizes not exactly as shown, so it should be understood that the embodiment is only illustrative. Similar to the J-sleeve (300) and L-sleeve (200) described above, the supply stop pipe insulating sleeve (500) may be coupled to other adjoining pipe insulating sleeves in series with it as part of a larger system (see, e.g., FIGS. 2A-2D). Particularly, it is contemplated that the supply stop pipe insulating sleeve (500) will be coupled to the supply stop pipe insulating sleeve (400) (see FIGS. 5A-5D) to insulate, together, a larger portion of the supply piping underneath the sink.

As illustrated particularly in FIGS. 6B-6D, the supply stop pipe insulating sleeve (500), like those previously described herein, is capable of opening up to (and beyond) 180° about an axis (D) defined by a hinge (501) at the closed portion (509). Such large degree of opening is advantageous to easily and conveniently accommodate a pipe within the sleeve without needing to manually split (or otherwise open) the sleeve. Like the previously-described sleeves, the supply stop pipe insulating sleeve (500) consists of first and second halves (502, 503) that are generally bifurcated by the hinge (501) separating them. As mentioned previously, the halves (502, 503) of the supply stop pipe insulating sleeve (500) are capable of rotation about the axis (D) defined by that hinge (501). Further, and as shown in FIG. 6B, the halves (502, 503) may each be fitted with a fastening mechanism (504), such as a hook-and-loop system as previously described, to facilitate retaining the supply pipe insulating sleeve in a closed configuration. Once the sleeve is closed and retained by the fastening mechanism (504), in order to open the sleeve for removal or adjustment, the user will need to apply sufficient force to overcome the retaining force of the fastening mechanisms (504).

With reference now to FIGS. 7A-7C, an extension tube pipe insulating sleeve (600) is illustrated in various views. FIG. 7A illustrates an open sleeve (extension tube pipe not shown for clarity). As shown the extension tube pipe insulating sleeve (600) may comprise a generally straight body elongate along a central axis ($A_{L5}$). It is understood that the extension tube pipe insulating sleeve (600) may comprise other orientations and sizes not exactly as shown, so it should be understood that the embodiment is only illustrative.

The extension tube pipe insulating sleeve (600), like those described previously, has a hollow interior portion that is configured to receive the underlying extension tube pipe. As shown a first end (601) of the sleeve has a generally larger diameter than an opposed second end (602) along the central axis ($A_{L5}$). As illustrated, the hollow interior portion at the first end (601) of the extension tube pipe insulating sleeve (600) has an internal diameter that is substantially equivalent to an outer diameter of the extension tube pipe insulating sleeve at the second end (602). This similarity of these inner and outer diameters enables multiple extension tube pipe insulating sleeves (600) to be coupled to one another in series along a respective series of underlying pipes, whereby the first end (601) of a first extension tube pipe insulating sleeve (600) will receive an equivalent second end (602) of a second extension tube pipe insulating sleeve (600). As one of skill in the art will appreciate, multiple extension tube pipe insulating sleeves (600) may be connected to one another using this process. However, the extension tube pipe insulating sleeve (600) is not so limited to coupling only to other extension tube pipe insulating sleeves (600) and may alternatively couple to other pipe insulating sleeves that are part of the system of pipe insulating sleeves, as shown and described herein.

As illustrated particularly in FIGS. 7B-7C, the extension tube pipe insulating sleeve (600), like those previously described herein, is capable of opening up to (and beyond) 180° about an axis defined by a hinge (610) at the closed portion. Such large degree of opening is advantageous to easily and conveniently accommodate a pipe within the sleeve without needing to manually split (or otherwise open) the sleeve. Like the previously-described sleeves, the extension tube pipe insulating sleeve (600) consists of first and second halves (611, 612) that are generally bifurcated by the hinge (610) separating them. As mentioned previously, the halves (611, 612) of the extension tube pipe insulating sleeve (600) are capable of rotation about the axis (E) defined by that hinge (610). Further, and as shown in FIG. 7B, the halves (611, 612) may each be fitted with a fastening mechanism (604), such as a hook-and-loop system as previously described, to facilitate retaining the extension tube pipe insulating sleeve (600) in a closed configuration. Once the sleeve is closed and retained by the fastening mechanism (604), in order to open the sleeve for removal or adjustment, the user will need to apply sufficient force to overcome the retaining force of the fastening mechanisms (604).

Figure 8:
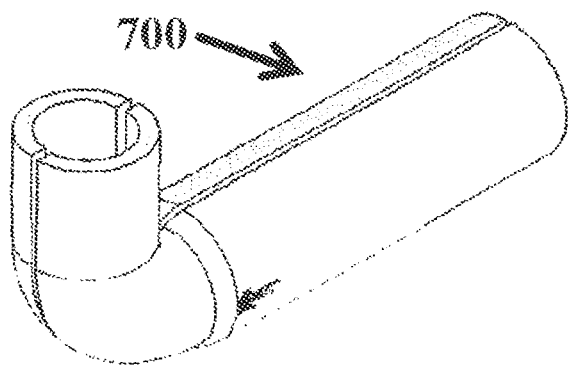
FIG. 8 is a perspective view of a grid drain offset pipe insulating sleeve, wherein the sleeve is in a closed configuration.
Figure 9:
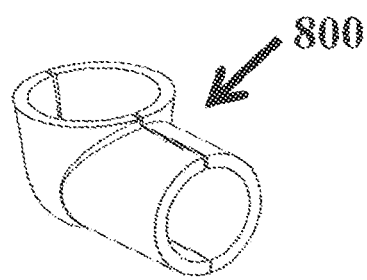
FIG. 9 is a perspective view of an elbow pipe insulating sleeve, wherein the sleeve is in a closed configuration.
Figure 10:
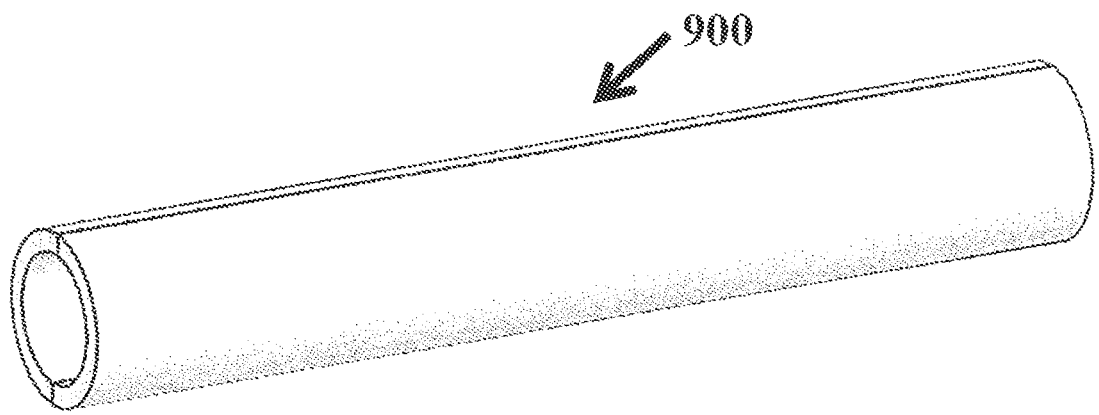
FIG. 10 is a perspective view of a grid drain pipe insulating sleeve, wherein the sleeve is in a closed configuration.

With reference now to FIGS. 8-10, embodiments of other additional pipe insulating sleeves are illustrated, which may be included in the system of pipe insulating sleeves described herein. FIG. 8 illustrates a grid drain offset pipe insulating sleeve (700), FIG. 9 illustrates an elbow pipe insulating sleeve (800), and FIG. 10 illustrates a grid drain pipe (900). These pipe insulating sleeves, though shown in closed configurations in each of FIGS. 8-10 share the same features as the other pipe insulating sleeves described herein. Namely, each of the sleeves of FIGS. 8-10 is additionally capable of opening up to and beyond 180° about a hinge axis on a hinge of each sleeve (not illustrated). Further, each sleeve of FIGS. 8-10 may include a fastening mechanism at an outer portion of the sleeves to retain each sleeve in a respective closed position.

In particular, the grid drain offset pipe insulating sleeve (700) of FIG. 8 has a non-constant diameter along its length, as well as a 90° bend in a body of the grid drain offset pipe insulating sleeve (although other degrees of bending, or no bending are contemplated). The non-constant diameter results in a first, large diameter at a first end of the body and a second, smaller diameter at a second opposing end of the body. This difference in diameter functions as a coupler and will permit the grid drain offset pipe insulating sleeve to couple to other pipe insulating sleeves having complementary couplers (or similar diameters at respective end portions) so as to mate therewith.

Figure 12:
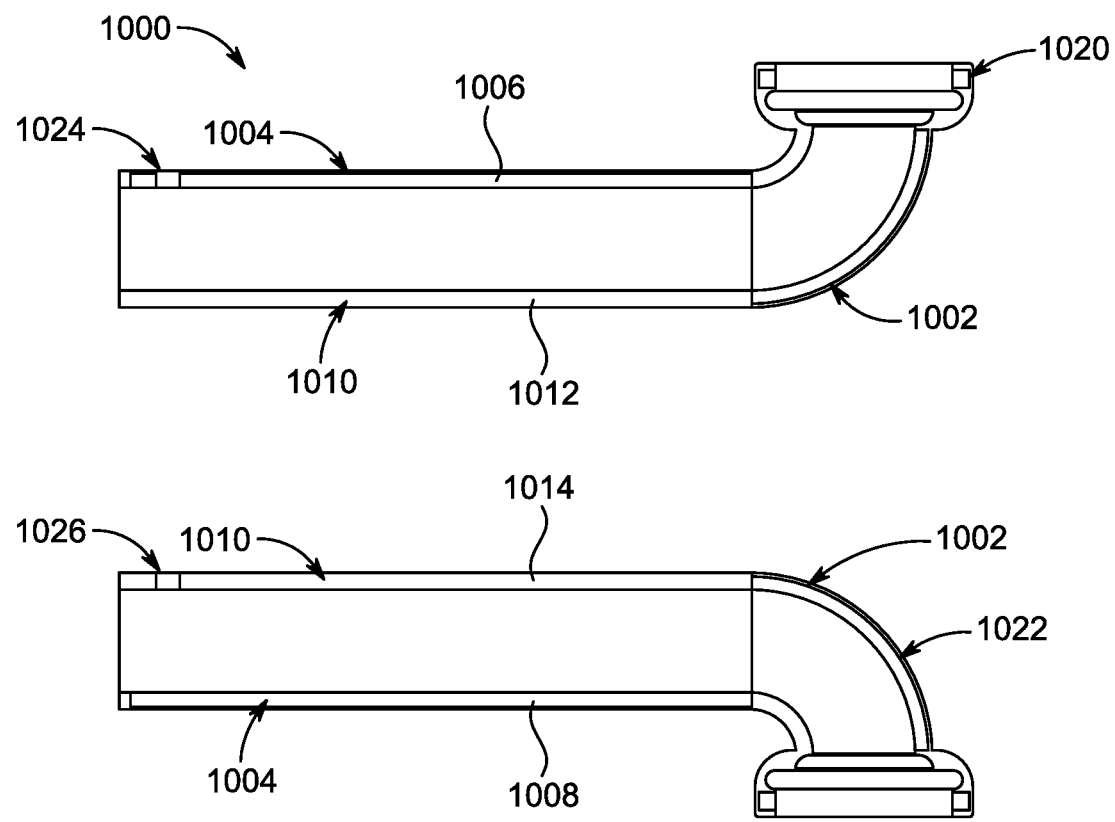
FIG. 12 illustrates a side view of a pipe insulating sleeve according to another embodiment.
Figure 13:
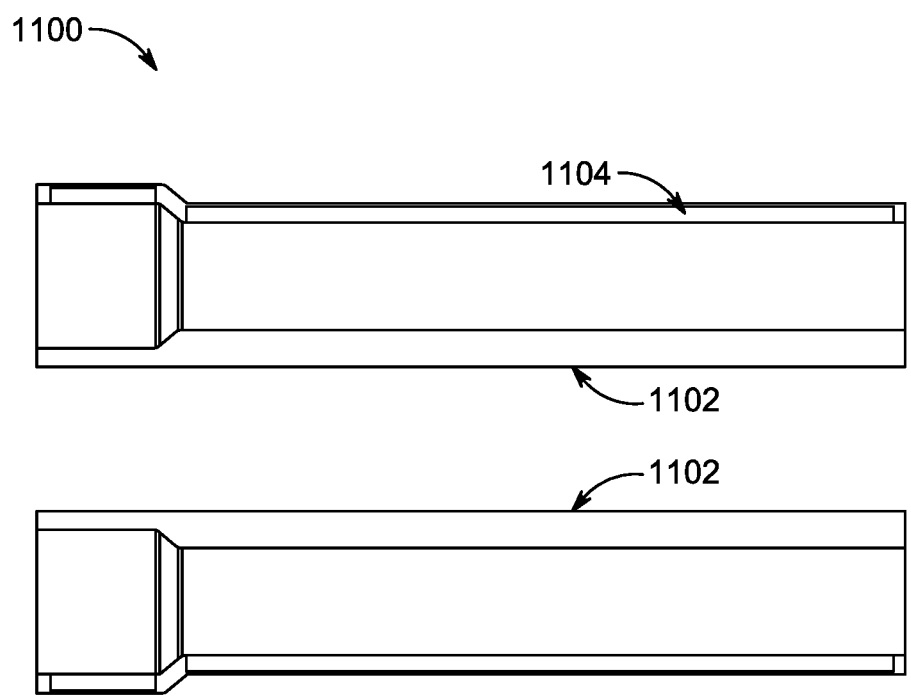
FIG. 13 illustrates a side view of a pipe insulating sleeve according to another embodiment.

FIGS. 12 and 13 illustrate alternate embodiments of pipe insulating sleeves (1000) and (1100). In the alternative embodiments, the pipe insulating sleeves (1000) and (1100) include a sleeve body (1002) and (1102), respectively. Each sleeve body (1002) and (1102) includes a first slit (1004) and (1104), respectively. These alternate embodiments may be generally characterized as a slitted design (also referred to as a "non-butterfly" design). Portions of the embodiments disclosed in FIGS. 12 and 13 are similar to aspects described above in FIGS. 1-11 and those portions function similarly to those described above.

FIG. 12 depicts an L-shaped pipe insulating sleeve ("L-sleeve") (1000) according to an embodiment of the invention. The sleeve (1000) includes the body (1002) that extends along an axis of elongation from a first end to a second end. The body (1002) includes an outer surface and an opposed inner surface that defines a channel that extends from a first opening located at the first end of the body (1002) to a second opening located at the second end of the body (1002). The body (1002) further includes the first slit (1004) that extends from the first opening to the second opening. The first slit (1004) includes a first edge (1006) and a second edge (1008). The first edge (1006) includes a first at least one magnet, and the second edge (1008) includes a corresponding second at least one magnet. The first at least one magnet and the second at least one magnet being configured to couple the first edge (1006) of the slit (1004) to the second edge (1008) of the slit (1004) together.

The body (1002) is configured to transition between a closed configuration and an open configuration. In the closed configuration, the first edge (1006) abuts against the second edge (1008) and the first at least one magnet is coupled to the second at least one magnet. In the open configuration, the first edge (1006) is spaced apart from the second edge (1008) and the first at least one magnet is de-coupled from the second at least one magnet. When installing the sleeve (1000), an operator may transition the sleeve body (1002) to the open configuration and slide the body (1002) around a pipe. Once the sleeve (1000) is in place, the sleeve body (1002) may be transitioned to the closed configuration.

The body (1002) further includes a second slit (1010) that extends from the first opening located at the first end of the body (1002) to the second opening located at the second end of the body (1002). The second slit (1010) includes a third edge (1012) and a fourth edge (1014). The third edge (1012) includes a third at least one magnet, and the fourth edge (1014) includes a corresponding fourth at least one magnet. The third at least one magnet and the fourth at least one magnet being configured to couple the third edge (1012) of the second slit (1010) to the fourth edge (1014) of the second slit (1010) together. In the closed configuration, the third edge (1012) abuts against the fourth edge (1014) and the third at least one magnet is coupled to the fourth at least one magnet. It will be appreciated that the body (1002) may include coupling elements other than the first, second, third, and fourth at least one magnets. For example, the body (1002) may include tab and slot coupling elements, hook and loop coupling elements, or other coupling elements configured to secure the first edge (1006) to the second edge (1008) and secure the third edge (1012) to the fourth edge (1014).

In the open configuration, the third edge (1012) is spaced apart from the fourth edge (1014) and the third at least one magnet is de-coupled from the fourth at least one magnet.

The first and third edges (1006) and (1012), and the first and third at least one magnets compose a first portion (1020) of the sleeve body (1002). The second and fourth edges (1008) and (1014), and the second and fourth at least one magnets compose a second portion (1022) of the sleeve body (1002). The first portion (1020) is selectively removable from the second portion (1022) forming two separate components. For example, when the first portion (1020) is removed from the second portion (1020), the sleeve defines two individual parts. The first portion (1020) defines a first half of the sleeve body (1002), and the second portion (1022) defines a second half of the sleeve body (1002). Completely separating the first portion (1020) from the second portion (1020) may be beneficial when installing the sleeve (1000) around a pipe.

The sleeve body (1002) may also include a first alignment element (1024) and a second alignment element (1026). The first alignment element (1024) being coupled to or formed on the first portion (1020) of the body (1002), and the second alignment element (1026) being coupled to or formed on the second portion (1022) of the body (1002). The first and second alignment elements (1024) and (1026) are configured to align the first and second portions (1020) and (1022) of the body (1002) such that the first at least one magnet is aligned with the third at least one magnet, and the second at least one magnet is aligned with the fourth at least one magnet, so as to form the first and second openings of the sleeve (1000). It will be appreciated that the first and second portions (1020) and (1022) of the body (1002) may include more alignment elements.

FIG. 13 illustrates the pipe insulating sleeve (1100). The pipe insulating sleeve (1100) is configured substantially similarly to the pipe insulating sleeve (1000), but includes a generally straight body elongate along a central axis, as opposed to a j-shape.

FIGS. 14A, 14B, 15A and 15B illustrate alternate embodiments of pipe insulating sleeves (1200) and (1300). In the alternative embodiments, the pipe insulating sleeves (1200) and (1300) include a sleeve body (1202) and (1302), respectively. Each sleeve body (1202) and (1302) includes a hinge (1204) and (1304), respectively. These alternate embodiments may be generally characterized as a partial hinge design. Portions of the embodiments disclosed in FIGS. 14A, 14B, 15A and 15B are similar to aspects described above in FIGS. 1-13 and those portions function similarly to those described above.

Figure 14A:
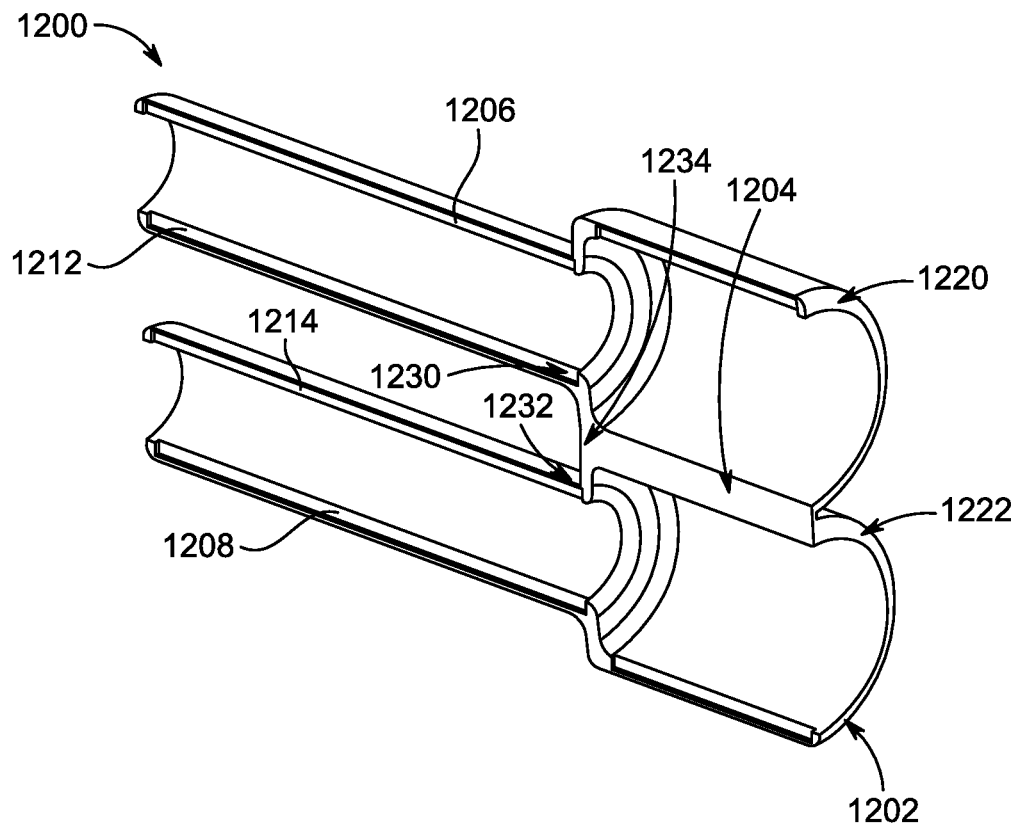
FIGS. 14A and 14B illustrate perspective views of a pipe insulating sleeve according to another embodiment.
Figure 14B:
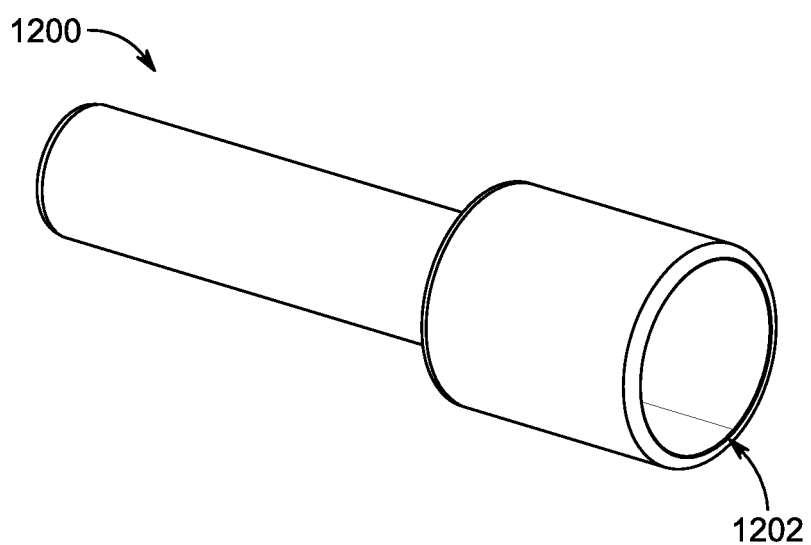

FIGS. 14A and 14B depict a generally straight body pipe insulating sleeve (1200) according to an embodiment of the invention. The sleeve (1200) includes the body (1202) that extends along an axis of elongation from a first end to a second end. The body (1202) includes an outer surface and an opposed inner surface that defines a channel that extends from a first opening located at the first end of the body (1202) to a second opening located at the second end of the body (1202). The body (1202) further includes a first edge (1206) and a second edge (1208). The first edge (1206) includes a first at least one magnet, and the second edge (1208) includes a corresponding second at least one magnet. The first at least one magnet and the second at least one magnet being configured to couple the first edge (1206) to the second edge (1208) together.

The body (1202) is configured to transition between a closed configuration and an open configuration. In the closed configuration, the first edge (1206) abuts against the second edge (1208) and the first at least one magnet is coupled to the second at least one magnet. In the open configuration, the first edge (1206) is spaced apart from the second edge (1208) and the first at least one magnet is de-coupled from the second at least one magnet. When installing the sleeve (1200), an operator may transition the sleeve body (1202) to the open configuration and position the body (1202) around a pipe. Once the sleeve (1200) is in place, the sleeve body (1202) may be transitioned to the closed configuration.

The body (1202) further includes a third edge (1212) and a fourth edge (1214). The third edge (1212) includes a third at least one magnet, and the fourth edge (1214) includes a corresponding fourth at least one magnet. The third at least one magnet and the fourth at least one magnet being configured to couple the third edge (1212) to the fourth edge (1214) together. In the closed configuration, the third edge (1212) abuts against the fourth edge (1214) and the third at least one magnet is coupled to the fourth at least one magnet. It will be appreciated that the body (1202) may include coupling elements other than the first, second, third, and fourth at least one magnets. For example, the body (1202) may include tab and slot coupling elements, hook and loop coupling elements, or other coupling elements configured to secure the first edge (1206) to the second edge (1208) and secure the third edge (1212) to the fourth edge (1214). In the open configuration, the third edge (1212) is spaced apart from the fourth edge (1214) and the third at least one magnet is de-coupled from the fourth at least one magnet.

The first and third edges (1206) and (1212), and the first and third at least one magnets compose a first portion (1220) of the sleeve body (1202). The second and fourth edges (1208) and (1214), and the second and fourth at least one magnets compose a second portion (1222) of the sleeve body (1202). The first portion (1220) is selectively rotatable relative to the second portion (1222) about the hinge (1204). For example, to transition the body (1202) from the closed position (e.g. FIG. 14B) to the open position (e.g. FIG. 14A), the first portion (1220) is rotated relative to the second portion (1222) about the hinge (1204), which separates the first edge (1206) from the second edge (1208) and the third edge (1212) from the fourth edge (1214). In an aspect, the hinge (1204) extends partially along a length of the sleeve body (1202). For example, the third edge (1212) extends from the first opening to a first location (1230) between the first opening and the second opening, and the fourth edge (1214) extends from the first opening to a second location (1232) between the first opening and the second opening. The hinge (1204) extends from the second opening to a location (1234) between the first opening and the second opening. The location (1234) is adjacent to the first location (1230) and the second location (1232) along the longitudinal axis of the pipe sleeve (1200).

Figure 15A:
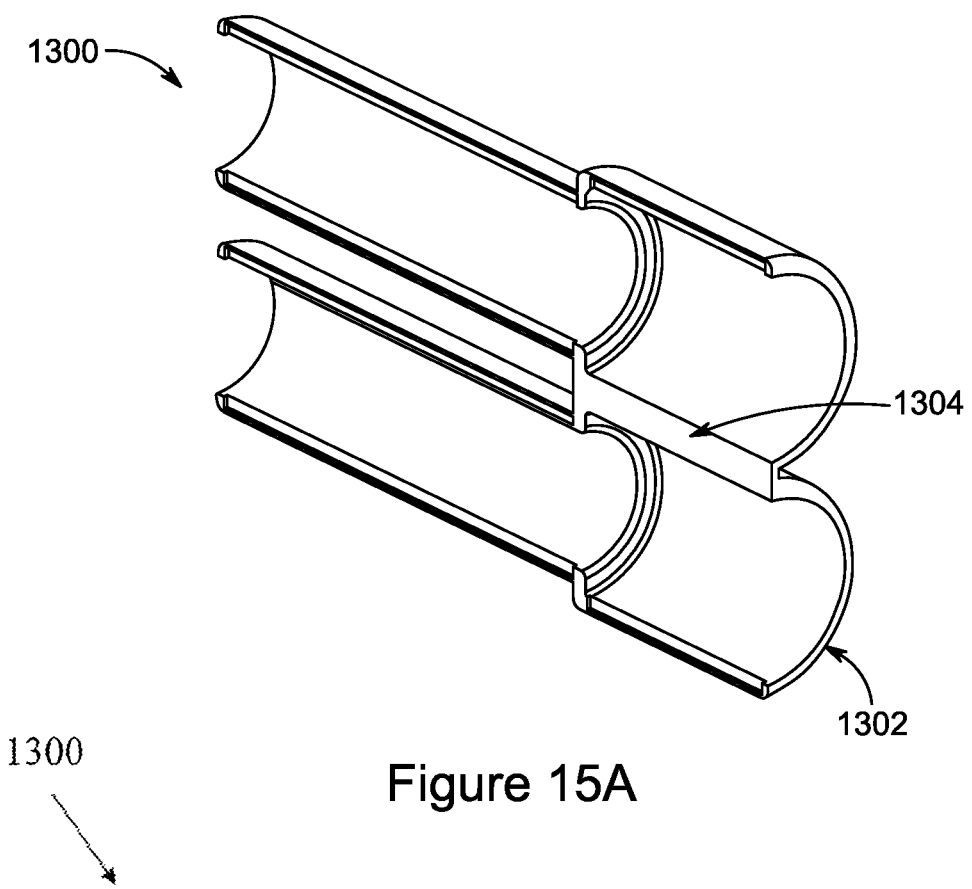
FIGS. 15A and 15B illustrate perspective views of a pipe insulating sleeve according to another embodiment.
Figure 15B:
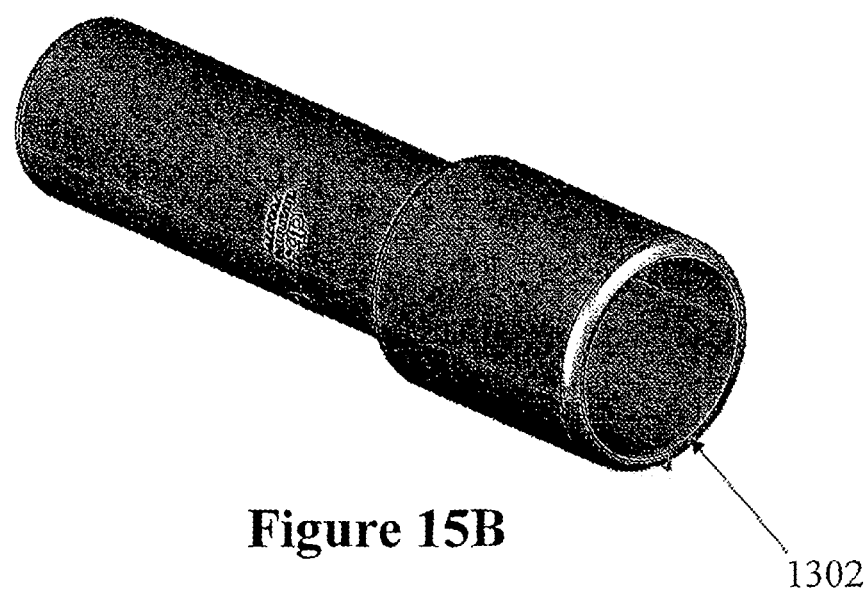

FIGS. 15A and 15B illustrate the pipe insulating sleeve (1300) in the open configuration and the closed configuration, respectively. The pipe insulating sleeve (1300) is configured substantially similarly to the pipe insulating sleeve (1200) but includes different sizes and dimensions for the body (1302).

The pipe insulating sleeves as presently described will advantageously possess anti-fungal and anti-bacterial properties that make them well-suited for undersink piping, which is particularly known to build up moisture. However, as previously described, the pipe insulating sleeves are not so-limited to undersink piping and can also be used in other types of piping where insulation is desired and where mold or bacteria may otherwise accumulate from excess moisture.

The anti-fungal and anti-bacterial properties of the present pipe-insulating sleeves are provided, in large part, by the materials from which the sleeves are constructed. In a first aspect, the pipe insulating sleeves are constructed of an elastomeric foam material. Importantly, the foam material itself comprises antifungal and antibacterial components. In other words, the antifungal and antibacterial aspects are dispersed throughout the foam material prior to being molded into the desired shape of the sleeve. This is an advantage over known sleeves in the art which utilize a coating on the outermost surfaces of the sleeve. Such alternatives are inferior to the presently disclosed material arrangement of elastomeric foam because the coating may wear away over time or become compromised due to trauma to the sleeves. When the coating of existing systems has become compromised, those compromised portions are greatly susceptible to the growth of bacteria and/or mold. Because the antifungal and antibacterial components are dispersed throughout the elastomeric foam material, the sleeves of the present disclosure are protected both inside and out from the growth of bacteria and/or mold.

An elastomeric foam material is ideally suited for the pipe insulating sleeves of the present invention. In one respect, the foam material may be compressed slightly on itself, which provides a certain softness that will minimize forceful impact by the user with the sleeves as they surround the pipes. Furthermore, the elastomeric foam material is smooth and uniform along its length, and any nicks or imperfections in the surface caused by trauma or forceful contact with the sleeves will not create puncture risks for a user that forcefully comes into contact with these nicks or imperfections. This represents an improvement over existing polyvinyl-chloride (PVC) or similarly suited hard materials. Importantly, the elastomeric foam material has heat insulating properties that make it ideal for inclusion in the material of a pipe insulating sleeve. The elastomeric foam material will insulate the underlying pipes by keeping heat from escaping through the sleeve and to the external environment. The end result is that the underlying pipe will retain its heat and lose less energy to the environment thereby increasing efficiency and saving costs (either relating to heating water through supply lines or costs of HVAC for heat undesirably transferred to the ambient air) and also that a user will not be scalded by coming into contact with a pipe insulating sleeve containing an underlying pipe. The elastomeric material may be made from a synthetic elastomeric material such as polyurethane, polyvinyl chloride, or silicon rubber, so as to provide the desired resiliency for facile installation as well as a suitable thermal conductivity value, good cushioning effects, and other desired properties. The material preferably has a foamed structure and any desired coloration. A particularly preferred elastomeric material is ethylene-vinyl-acetate (EVA).

A method of installing a pipe insulating sleeve system according to an embodiment generally comprises installing individual pipe insulating sleeves on the various undersink pipes. The method is not limited to installing the sleeves in series with one another (i.e., by removably connecting them to one another at their respective ends), as one of ordinarily skill in the art will appreciate that the sleeves may be installed individually. However, in order to comply with the requirements of the ADA, a user may be required to completely insulate a series of piping within a certain distance of the edge of the sink. Accordingly, the disclosed exemplary method will relate to installing the pipe insulating sleeves on a set of undersink pipes in a series.

The method of installing a pipe insulating sleeve system on an undersink pipe will ordinarily start by identifying an undersink pipe to be insulated by a pipe insulating sleeve. A user is not required to necessarily start the method with any particular undersink pipe, and the user is generally free to choose a first undersink pipe to insulate.

Next, a user will select a pipe insulating sleeve that is sized and configured to be installed on the identified undersink pipe. As described above, the pipe insulating sleeve is ordinarily elongate along a first axis.

In another step, the user opens the pipe insulating sleeve by rotating a first half of a body of the pipe insulating sleeve relative to a second half of the body about a second axis defined by a hinged joint that bifurcates the first half from the second half. A person having ordinary skill in the art will appreciate that opening the pipe insulating sleeve creates a gap at an outer edge of the pipe insulating sleeve on the opposite side of first axis from the hinged joint. This size of the gap is a function of the degree of rotation of the first half relative to the second half about the second axis. The larger the degree of rotation, the larger the gap will be and hence the easier it will be to pass a pipe through the gap and into a hollow interior of the pipe insulating sleeve. Importantly, the pipe insulating sleeve is capable of a large degree of rotation (approaching and surpassing 180° of rotation) which will greatly simplify passing the undersink pipe through the gap.

In a further step, the user will retain the identified undersink pipe within the hollow interior portion of the pipe insulating sleeve by passing the identified pipe through the gap along a direction generally perpendicular to the first axis of the pipe insulating sleeve. The identified undersink pipe will be fully inserted through the gap and will be captured within the hollow interior of the pipe insulating sleeve. As described in greater detail above, the hollow interior portion of the pipe insulating sleeve is sized and configured to mate with the outer surface of the undersink pipe. In other words, the inner diameter of the pipe insulating sleeve will closely match the outer diameter of the identified undersink pipe. However, one of skill in the art will appreciate that the inner diameter of the pipe insulating sleeve may be slightly larger so as to interpose a small layer of air between the pipe insulating sleeve and the identified undersink pipe. This small layer of air may be advantageous in providing further heat insulating property by minimizing heat transfer otherwise accomplished by the direct contact between the undersink pipe and the pipe insulating sleeve.

In a further method step, the user will close the pipe insulating sleeve by rotating the first half relative to the second half in the opposite direction as in the opening step so as to capture the identified undersink pipe within the pipe insulating sleeve and thereby close the gap. As described in greater detail above, the outer edge adjacent the gap may comprise two edges that abut one another when the pipe insulating sleeve has been closed. To retain the pipe insulating sleeve in the closed configuration, each one of the two edges may be equipped with a complementary fastening mechanism to the other, opposing edge. The fastening mechanism may comprise Velcro® brand fasteners, or other hook-and-loop design. In other embodiments described herein, the fastening mechanism may comprise magnetic closure devices having high magnetic field strength.

In an additional step, the user may adjust the positioning of the pipe insulating sleeve. The adjusting may be accomplished by shifting the pipe insulating sleeve about the identified undersink pipe by translating the pipe insulating sleeve along the first axis. The adjusting may also be accomplished by rotating the pipe insulating sleeve about the first axis. In another respect, the adjusting may be accomplished by removing the pipe insulating sleeve and re-installing it on the identified undersink pipe or on a different undersink pipe than the identified undersink pipe.

In an additional step, the user may remove the pipe insulating sleeve from the identified undersink pipe. The removal may be accomplished by opening the pipe insulating sleeve by rotating the first half of the body relative to the second half of the body along the second axis defined by the hinge. The opening must be performed with sufficient force to disengage the fastening mechanisms on the two abutting edges of the pipe insulating sleeve. Once the fastening mechanisms have been disengaged, the pipe insulating sleeve may be separated from the identified undersink pipe by removing the undersink pipe through the gap.

The method of installing the present system may be further expanded by performing the installation steps using other pipe insulating sleeves. In other words, the pipe insulating sleeve as described above would represent a first pipe insulating sleeve in the system, and the method of installing would further include installing a second pipe insulating sleeve on a different undersink pipe than the identified pipe insulating sleeve. As described above, it may be advantageous or desired for the different undersink pipe to be immediately adjacent and connected to the identified undersink pipe, although that proximity is not required.

The method may further include installing additional pipe insulating sleeves (e.g., third, fourth, fifth, sixth, etc.) on additionally different undersink pipes than the different undersink pipe and then the identified undersink pipe. It may be desired in a given application to install a pipe insulating sleeve on each and every exposed undersink pipe, and indeed, the method may include installing sufficient pipe insulating sleeves to cover each of such undersink pipes.

For the sake of brevity, the method of installing the second, third, etc. pipe insulating sleeves is sufficiently similar to the method of installing the first pipe insulating sleeve as described above. Therefore, one of skill in the art will understand that the installation of, adjustment of, and removal of the second, third, etc. pipe insulating sleeves may be accomplished in a similar manner.

One notable difference, however, of installing the second, third, etc. pipe insulating sleeves may arise if the second, third, etc. pipe insulating sleeve is to be installed immediately adjacent to a previously installed pipe insulating sleeve. In such an instance, a user may desire to removably connect, couple, or attach the second, third, etc. pipe insulating sleeve to the previously installed pipe insulating sleeve. As described in greater detail above, the user may mate the coupler of the second, third, etc. pipe insulating sleeve with the corresponding coupler of the previously installed pipe insulating sleeve. Mating the respective couplers may be accomplished by, for example, overlaying a portion of the second, third, etc. pipe insulating sleeve with the previously installed pipe insulating sleeve (or vice versa), however other coupling mechanisms and methods of coupling are contemplated, such as (by way of non-limiting example) using adhesives, glues, tabs, screws, or other coupling mechanisms known in the art. It will be understood that coupling adjacent pipe insulating sleeves to one another will create a seal between the coupled pipe insulating sleeves.

Although the foregoing description relates primarily to the use of the pipe insulating sleeves of the present invention in undersink piping applications, it will be understood by one of ordinary skill in the art that the invention is not so-limited. For instance, it is contemplated that the presently disclosed pipe insulating sleeves may be utilized to cover any piping, regardless of location or the fluid contained therein, where insulation may be desired. As described above, such usage will advantageously provide thermal insulation to the fluid being transported through the piping by preventing internal heat from transferring into the ambient environment. Furthermore, such insulation may provide protection for equipment or the like immediately adjacent the piping, which would adversely be affected by heat.

What is claimed is:

1. A system for insulating pipes, the system comprising:
a body that extends along an axis of elongation from a first end to a second end, the body having an outer surface and an opposed inner surface, the inner surface defining a channel that extends from a first opening located at the first end of the body to a second opening located at the second end of the body, the body including a first face, a second face, a third face, and a fourth face that extend the entire distance from the first opening to the second opening, the first, second, third, and fourth faces extending between the outer surface of the body and the inner surface of the body; and
a fastening assembly including a first fastening element, a second fastening element, a third fastening element, and a fourth fastening element, the first fastening element being positioned in direct contact with the first face, the second fastening element being positioned in direct contact with the second face, the third fastening element being positioned in direct contact with the third face, and the fourth fastening element being positioned in direct contact with the fourth face, wherein the first and third fastening elements being configured to couple together, and the second and fourth fastening elements being configured to couple together;
wherein the body is configured to transition between a closed configuration and an open configuration, wherein in the closed configuration the first face abuts against or is positioned immediately adjacent to the third face and the first fastening element is coupled to the third fastening element and the second face abuts against or is positioned immediately adjacent to the fourth face and the second fastening element is coupled to the fourth fastening element, and wherein in the open configuration, the first face is spaced apart from the third face and the first fastening element is de-coupled from the third fastening element and the second face is spaced apart from the fourth face and the second fastening element is de-coupled from the fourth fastening element,
wherein the first end of the body is configured to overlap with a further pipe insulating body so as to be cooperatively and removably joined to the further pipe insulating body in series, and
wherein the further pipe insulating body comprises
an outer surface and an opposed inner surface, the inner surface defining a channel that extends from a first opening located at the first end of the further pipe insulating body to a second opening located at the second end of the further pipe insulating body;
a first face and a second face that extend the entire distance from the first opening to the second opening of the further pipe insulating body, the first and second faces extending between the outer surface of the further pipe insulating body and the inner surface of the further pipe insulating body; and a fastening assembly including a first fastening element and a second fastening element, the first fastening element being positioned in direct contact with the first face of the further pipe insulating body, the second fastening element being positioned in direct contact with the second face of the further pipe insulating body, wherein the first and second fastening elements of the further pipe insulating body being configured to couple together;
wherein the further pipe insulating body is configured to transition between a closed configuration and an open configuration, wherein in the closed configuration the first face of the further pipe insulating body abuts against or is positioned immediately adjacent to the second face of the further pipe insulating body and the first fastening element of the further pipe insulating body is coupled to the second fastening element of the further pipe insulating body, and wherein in the open configuration, the first face of the further pipe insulating body is spaced apart from the second face of the further pipe insulating body and the first fastening element of the further pipe insulating body is de-coupled from the second fastening element of the further pipe insulating body.

2. The system of claim 1, wherein the first, second, third and fourth fastening elements are sized and configured to selectively retain the body in the closed configuration.

3. The system of claim 1, wherein the body comprises a J-shaped tubular body, configured to receive a J-shaped pipe section of a P-trap.

4. The system of claim 1, wherein the first opening extends along a first plane, the second opening extends along a second plane that is parallel to the first plane.

5. The system of claim 1, wherein the body comprises an elastomeric foam material.

6. The system of claim 5, wherein the elastomeric foam material comprises ethylene-vinyl acetate, antifungal and antimicrobial ingredients, or combinations thereof.

7. The system of claim 1, wherein the body includes a first portion and a second portion selectively removable from the first portion, the first portion of the body including the first fastening element and the second fastening element, the second portion of the body including the third fastening element and the fourth fastening element.

8. The system of claim 7, wherein the first portion of the body includes a first alignment element and the second portion of the body includes a second alignment element, and wherein when the body is in the closed configuration the first alignment element aligns with the second alignment element.

9. The system of claim 1, wherein the body includes a first portion and a second portion, wherein a hinge is integrally formed with and connects the first portion and the second portion, wherein the hinge extends at least partially between the first opening and the second opening.

10. A method of installing a pipe insulating system on a pipe, the pipe insulating system including a sleeve body extending along an axis of elongation from a first end to a second end and having an outer surface and an opposed inner surface, the inner surface defining a channel that extends from a first opening at the first end to a second opening at the second end, the sleeve body further including a first face, a second face, a third face, and a fourth face that each extend between the outer surface and the inner surface and that each extend the entire distance from the first opening to the second opening, the method comprising the steps of:

transitioning the sleeve body to an open configuration, wherein in the open configuration the first face is spaced apart from the third face and the second face is spaced apart from the fourth face, the first face having a first fastening element positioned in direct contact with the first face, the second face having a second fastening element positioned in direct contact with the second face, the third face having a third fastening element positioned in direct contact with the third face, and the fourth face having a fourth fastening element positioned in direct contact with the fourth face;

retaining a first portion of the pipe within the channel of the sleeve body by inserting the pipe between the first and third faces and the second and fourth faces;

transitioning the sleeve body to a closed configuration, wherein in the closed configuration the first face abuts against or is positioned immediately adjacent to the third face and the first fastening element is coupled to the third fastening element and the second face abuts against or is positioned immediately adjacent to the fourth face and the second fastening element is coupled to the fourth fastening element so as to enclose the first portion of the pipe within the sleeve body; and removably engaging either the first end or the second end of the sleeve body with a first or second end of a further sleeve body enclosing a second portion of the pipe that is adjacent to the first portion of the pipe that is enclosed within the sleeve body, wherein the further sleeve body comprises an outer surface and an opposed inner surface, the inner surface of the further sleeve body defining a channel that extends from a first opening at the first end of the further sleeve body to a second opening at the second end of the further sleeve body;

a first face and a second face that both extend between the outer surface of the further sleeve body and the inner surface of the further sleeve body and that each extend the entire distance from the first opening of the further sleeve body to the second opening of the further sleeve body;

a first fastening element positioned in direct contact with the first face surface of the further sleeve body, a second fastening element positioned in direct contact with the second face surface of the further sleeve body, wherein in an open configuration of the further sleeve body the first face of the further sleeve body is spaced apart from the second face of the further sleeve body, and in a closed configuration of the further sleeve body the first face of the further sleeve body abuts against or is positioned immediately adjacent to the second face of the further sleeve body and the first fastening element of the further sleeve body is coupled to the second fastening element of the further sleeve body.

11. The method of claim 10, further comprising the step of:

selecting a sleeve body that is sized and configured to be installed on the pipe, the sleeve body being elongate along a sleeve axis.

12. The method of claim 11, further comprising the step of:

adjusting the positioning of the sleeve body by any one of rotating or translating the sleeve body about or along the sleeve axis relative to the pipe.

13. The method of claim 10, the method further comprising the step of:

removing the sleeve body from the pipe by transitioning the sleeve body from the closed configuration to the open configuration, wherein the removing step is performed with sufficient force to cause the second fastening element to de-couple from the fourth fastening element so as to form a gap sufficiently large so as to pass the pipe outwardly from the channel of the sleeve body.

14. The method of claim 10, wherein the sleeve body includes a first portion and a second portion selectively removable from the first portion, the first portion of the sleeve body including the first fastening element and the second fastening element, the second portion of the sleeve body including the third fastening element and the fourth fastening element.

15. The method of claim 14, wherein the first portion of the sleeve body includes a first alignment element and the second portion of the sleeve body includes a second alignment element, the method further comprising the step of:

aligning the first alignment element of the first portion of the sleeve body with the second alignment element of the second portion of the sleeve body, such that when the sleeve body is in the closed configuration the first alignment element aligns with the second alignment element.

16. The method of claim 10, wherein the body includes a first portion and a second portion, wherein the first portion is coupled to the second portion via a hinge, wherein the hinge extends at least a portion between the second opening and the first opening.

17. The method according to claim 10, wherein the first end or second end of the sleeve body removably engages the first or second end of the further sleeve body by overlapping arrangement.

18. A system for insulating pipes, the system comprising:

a first sleeve defining a hollow first body that extends from a first end to a second end, the first body having a first outer surface and an opposed first inner surface, wherein the first body includes a first half and a second half separated by a first hinge integrally formed with and connecting the first and second halves, the first hinge defining a first rotation axis, the first half of the first body defining first and second edges that are planar and the second half of the first body defining third and fourth edges that are planar, the first and third edges being connected by the first hinge, and wherein the first, second, third, and fourth edges extend the entire distance from the first end to the second end;

wherein the second edge includes a first fastening element and the fourth edge includes a second fastening element, wherein the first and second fastening elements are releasably connectable for securing the first half to the second half, wherein the first and second halves are rotatable about the first rotation axis, such that the first sleeve defines:

A) a closed configuration wherein the second and fourth edges abut one another or are immediately adjacent thereto causing the first fastening element to engage the second fastening element, and B) a partially open configuration wherein the second and fourth edges are spaced apart and the first angle is between 0° and 180°; and, a second sleeve that is configured to engage with the first end or the second end of the first sleeve so as to be cooperatively and removably joined to the first sleeve in series, the second sleeve defining a hollow channel that extends from a first end of the second sleeve to a second end of the second sleeve, the second sleeve further having a first outer surface and an opposed first inner surface, wherein the second sleeve further includes a first half and a second half separated by a first hinge integrally formed with and connecting the first and second halves of the second sleeve, the first hinge of the second sleeve defining a first rotation axis, the first half of the second sleeve defining a first edge that is planar and the second half of the second sleeve defining a second edge that is planar, the first and second edges of the second sleeve being connected by the first hinge of the second sleeve, and wherein the first and second edges of the second sleeve extend the entire distance from the first end of the second sleeve to the second end of the second sleeve;

wherein second sleeve includes a first fastening element a second fastening element, wherein the first and second fastening elements of the second sleeve are releasably connectable for securing the first half of the second sleeve to the second half second sleeve wherein the first and second halves of the second sleeve are rotatable about the first rotation axis, such that the second sleeve defines:

A) a closed configuration wherein the first and second edges of the second sleeve abut one another or are immediately adjacent thereto causing the first fastening element of the second sleeve to engage the second fastening element of the second sleeve, and B) a partially open configuration wherein the first and second edges of the second sleeve are spaced apart.

19. The system according to claim 18, wherein the first end or second end of the first sleeve removably engages the first or second end of the second sleeve by overlapping arrangement.

* * * * *